(12) United States Patent
Brinskelle

(10) Patent No.: US 10,511,448 B1
(45) Date of Patent: Dec. 17, 2019

(54) SECURE COMMUNICATIONS IMPROVEMENTS

(71) Applicant: Jeffrey E. Brinskelle, Ottawa (CA)

(72) Inventor: Jeffrey E. Brinskelle, Ottawa (CA)

( * ) Notice: Subject to any disclaimer, the term of this patent is extended or adjusted under 35 U.S.C. 154(b) by 140 days.

(21) Appl. No.: 13/843,663

(22) Filed: Mar. 15, 2013

(51) Int. Cl.
*H04L 29/06* (2006.01)
*H04L 9/32* (2006.01)

(52) U.S. Cl.
CPC ........ *H04L 9/3263* (2013.01); *H04L 63/0823* (2013.01); *H04L 63/126* (2013.01)

(58) Field of Classification Search
CPC .......................... H04L 63/126; H04L 63/0823
See application file for complete search history.

(56) References Cited

U.S. PATENT DOCUMENTS

| | | | |
|---|---|---|---|
| 2002/0026427 A1* | 2/2002 | Kon et al. ................... 705/67 |
| 2002/0073308 A1* | 6/2002 | Benantar ...................... 713/155 |
| 2002/0091798 A1* | 7/2002 | Joshi et al. .................. 709/219 |
| 2002/0124090 A1* | 9/2002 | Poier .................. H04L 63/0272 709/228 |
| 2004/0078597 A1* | 4/2004 | Sun et al. .................... 713/201 |
| 2004/0237031 A1* | 11/2004 | Micali et al. ................ 715/511 |
| 2005/0283614 A1* | 12/2005 | Hardt ........................... 713/182 |
| 2006/0053290 A1* | 3/2006 | Randle ............... G06Q 20/027 713/169 |
| 2006/0117104 A1* | 6/2006 | Taniguchi ........... H04L 63/0272 709/225 |
| 2006/0117179 A1* | 6/2006 | Karabulut .......... H04L 63/0823 713/175 |
| 2006/0129817 A1* | 6/2006 | Borneman .............. G06F 21/41 713/170 |
| 2006/0200487 A1* | 9/2006 | Adelman ............. G06Q 10/107 |
| 2007/0061734 A1* | 3/2007 | Abdulhayoglu .............. 715/742 |
| 2007/0266249 A1* | 11/2007 | Kinser et al. ................. 713/173 |
| 2008/0133540 A1* | 6/2008 | Hubbard ............... H04L 63/101 |
| 2009/0144541 A1* | 6/2009 | Kim .................... H04L 63/0869 713/156 |
| 2010/0192068 A1* | 7/2010 | Wineinger ........ G06F 17/30905 715/744 |
| 2011/0055911 A1* | 3/2011 | Adelman ............. G06Q 10/107 726/7 |
| 2012/0072720 A1* | 3/2012 | Rescorla ............... H04L 9/3268 713/158 |
| 2014/0025521 A1* | 1/2014 | Alsina ................ G06Q 30/0601 705/26.1 |

(Continued)

OTHER PUBLICATIONS

Keep Your Mac Safe from Web Security Flaws. Glenn Fleishman [online]. Macworld, Sep. 23, 2011 [retrieved on Jul. 30, 2014]. Retrieved from the Internet: <URL: http://www.macworld.com/article/1162472/keep_your_mac_safe_from_web_security_flaws.html>.*

(Continued)

*Primary Examiner* — John B King
*Assistant Examiner* — Arya Golriz

(57) ABSTRACT

Methods and apparatus related to improving secure communications are described. In an embodiment, a security agent pins a domain to a certificate. The certificate is used in authenticating the domain, and the existence of a pinning indicator within the certificate is used in authenticating the domain. Once the security agent pins the domain to a certificate, a relationship between the domain and the certificate used in authenticating the domain is stored. Other embodiments are also disclosed and claimed.

21 Claims, 30 Drawing Sheets

(56) References Cited

U.S. PATENT DOCUMENTS

2015/0195243 A1* 7/2015 Roskind ............. H04L 61/1511
                                                          709/213

OTHER PUBLICATIONS

Pinning Hopes on Pinning. G.F. [online]. The Economist, Sep. 12, 2011, [retrieved on Jul. 30, 2014]. Retrieved from the Internet: <URL: http://www.economist.com/blogs/babbage/2011/09/internet-security-0>.*

RFC-6187: x.509v3 Certificates for Secure Shell Authentication. K. Igoe [online], Internet Engineering Task Force (IETF) Mar. 2011 [retrieved on Jul. 31, 2014]. Retrieved from the Internet: <URL: http://tools.ietf.org/html/rfc6187>.*

* cited by examiner

| KEY | VALUE |
|---|---|
| Version | V3 |
| Serial Number | 00 00 01 |
| Signature Algorithm | SHA-1 with RSA encryption |
| Issuer | ExampleCA |
| AuthorityKeyIdentifier | keyid:4E:43:C8:1A:46:8F:37:53:7A:4F:F2:58:6F:94:F3:38:E2:D5:BD:DF |
| Valid From | Jan 1, 2013 12:01am |
| Valid To | Jan 1, 2014 12:00am |
| Subject | CN=www.example.org, O=Example Corp, C=US |
| SubjectKeyIdentifier | keyid:4E:43:C9:1B:46:8F:37:53:7A:4F:F2:58:6F:94:F3:38:E2:D5:BD:DE |
| SubjectPublicKeyInfo | Public Key Algorithm:rsa Encryption RSA Public Key:(1024 bit) Modulus (1024 bit): 00:cc:ab:d1:01:02:03:4d:c4:55:c8:fe:89:44:a4:9c:a1:d8:09:fc:7e:d7:42:53: c7:7e:5b:83:61:3a:50:f2:08:7a:82:a9:cf:f9:36:be:83:b3:47:a5:3a:b9:e9:60: 6b:c7:59:b6:cf:39:79:9f:95:4e:7d:5d:4a:50:32:51:42:53:a9:d4:a2:86:4a:db: a6:55:a4:85:09:d3:ff:68:1d:cd:d3:f7:78:27:95:84:ec:de:57:5c:f7:fe:e2:31:9 d:16:b0:6a:f5:65:7c:ca:ac:ac:59:81:36:e0:bf:a5:a3:1c:d2:7e:81:28:0b:34:3 9:7a:9a:9c:cd:01:4e:4e:57 Exponent:65537 (0x10001) |
| SubjectAltName | DNS: *.example.com, DNS :example.com |
| Public Key | RSA (1024 bits) [30 31 89 02 .... 03 01 00 01] |
| Key Usage | Digital Signature, Key Encipherment |
| ExtendedKeyUsage | TLS Web Server Authentication |
| X.509v3 CertificatePolicy | Policy: 9.8.7.6.5.4.3333.22.1 CPS: https://www.example.org/CPS |
| CRL Distribution Point | http://crl.examplecaissuer.com/1.crl |
| Thumbprint | SHA-1 [ab cd de ... 88 99 aa] |
| Digital Signature | SHA-1 with RSA encryption [30 38 c3 d5 ... 88 18 53 f8] |

FIG. 3

| Domain | Peer Identifier |
|---|---|
| www.example.com | SPKI:01:02:03:04 |
| www.example.com | SPKI:01:02:03:05 |
| www.example.com | CERT:30:20:01:02 |
| www.example.com | SKI:30:80:01:02 |
| www.example.com | AKI:30:80:01:03 |

FIG. 7

| Type | Indicator | Found In |
|---|---|---|
| Explicit | presence of a pinning indicator OID | Certificate |
| Implicit | presence of a certificate extension | Certificate |
| Implicit | presence of an OID within a certificate | Certificate |
| Implicit+Explicit | presence of a certificate extension consisting of specific OID, and value contains Domain to pin | Certificate |
| Implicit+Explicit | presence of a certificate extension consisting of specific OID, and value contains Hostname to pin | Certificate |
| Implicit+Explicit | presence of a certificate extension consisting of specific OID, and value contains Boolean flag whether to pin or not | Certificate |
| Explicit | presence of SSL/TLS extension or flag | Protocol |
| Explicit | presence of SSL/TLS message | Protocol |
| Implicit | Issuer + Domain is present | Certificate |
| Implicit | issuer is an authorized pinning issuer | Certificate |
| Implicit | Country component of Subject DN is authorized for certificate issuer | Certificate |
| Implicit | EKU is authorized for certificate issuer | Certificate |
| Implicit | First time certificate was seen was greater than X days ago | Certificate |

FIG. 12

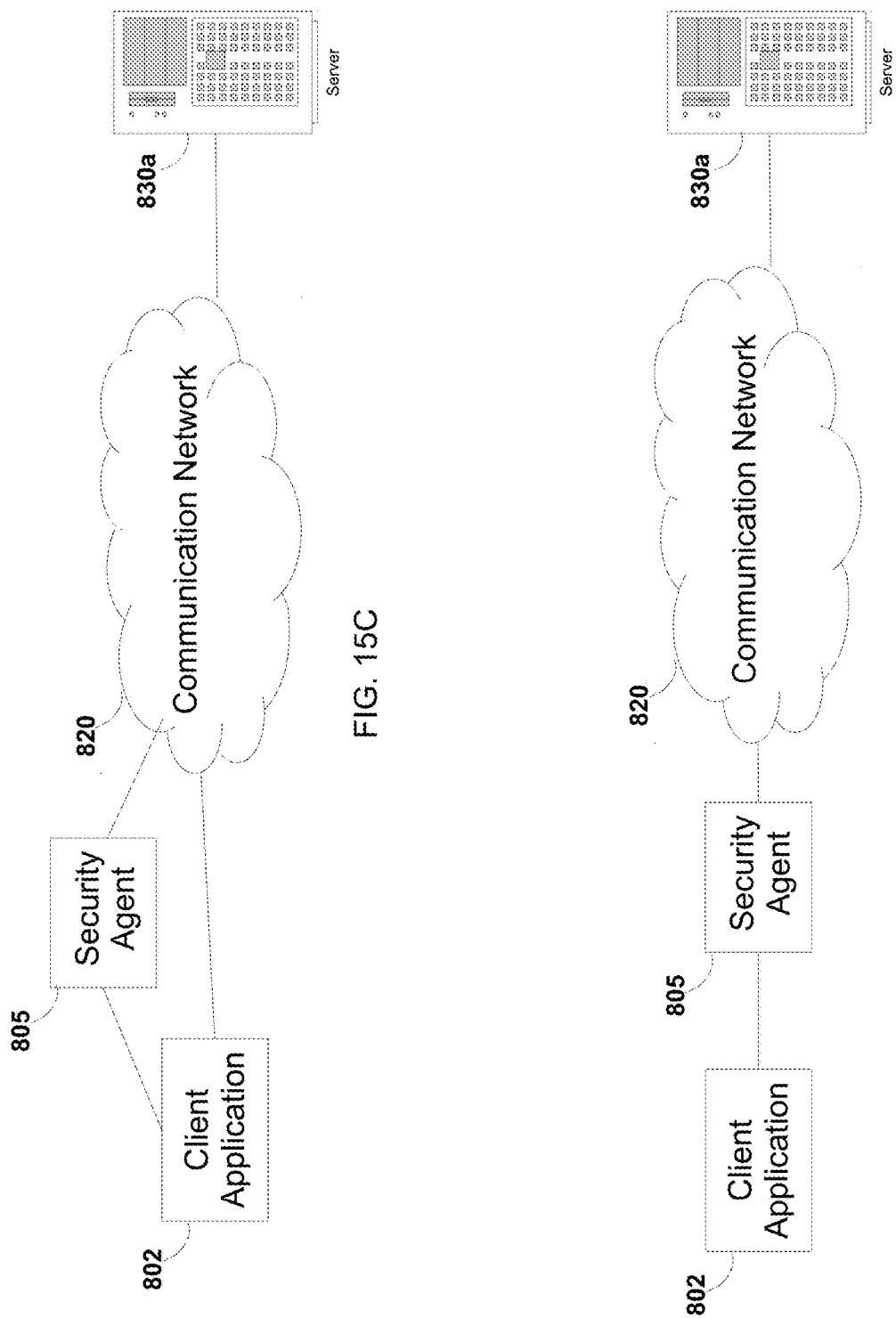

| Rule # | Data Field | Function | Acceptable Values | Action |
|---|---|---|---|---|
| 1 | cert.Issuer | isPresent(cert.Issuer, AuthCertPinningCAs) | TRUE | pinnedInfo.peerIdentifiers[0] = peerId; pinnedInfo.domain = domain; |
| 2 | cert.Issuer.CPS | isPresent(cert.Issuer.CPS, EV_OIDS) | TRUE | pinnedInfo.peerIdentifiers[0] = peerId; pinnedInfo.domain = domain; |
| 3 | cert.Subject.O | isNull(cert.Subject.O) | FALSE | pinnedInfo.peerIdentifiers[0] = peerId; pinnedInfo.domain = domain; |
| 4 | cert.Subject.O | isNull(cert.Subject.O) | FALSE | pinnedInfo.peerIdentifiers[0] = peerId; pinnedInfo.domain = domain; |
| 5 | cert | firstSeen(cert) | > 30days | pinnedInfo.peerIdentifiers[0] = peerId; pinnedInfo.domain = domain; |
| 6 | cert | certRating(cert) | > 5 | pinnedInfo.peerIdentifiers[0] = peerId; pinnedInfo.domain = domain; |
| 7 | cert.PinningIndicator | isNull(cert.PinningIndicator) | FALSE | pinnedInfo.peerIdentifiers[0] = peerId; pinnedInfo.domain = domain; |
| 8 | cert | containsOID(cert, CERT_PINNING_OID) | TRUE | pinnedInfo.peerIdentifiers[0] = peerId; pinnedInfo.domain = domain; |
| 9 | cert.Subject.C, cert.Issuer | isPresent(cert.Subject.C, cert.Issuer, AuthCountriesForIssuer) | TRUE | pinnedInfo.peerIdentifiers[0] = peerId; pinnedInfo.domain = domain; |
| 10 | cert.KeyUsage, cert.Issuer | isPresent(cert.KeyUsage, cert.Issuer, AuthKeyUsagesForIssuer) | TRUE | pinnedInfo.peerIdentifiers[0] = peerId; pinnedInfo.domain = domain; |

FIG. 16

| KEY | VALUE |
| --- | --- |
| Version | V3 |
| Serial Number | 00 00 01 |
| Signature Algorithm | SHA-1 with RSA encryption |
| Issuer | ExampleCA |
| AuthorityKeyIdentifier | keyid:4E:43:C8:1A:46:8F:37:53:7A:4F:F2:58:6F:94:F3:38:E2:D5:BD:DF |
| Valid From | Jan 1, 2013 12:01am |
| Valid To | Jan 1, 2014 12:00am |
| Subject | CN=www.example.org, O=Example Corp, C=US |
| SubjectKeyIdentifier | keyid:4E:43:C9:1B:46:8F:37:53:7A:4F:F2:58:6F:94:F3:38:E2:D5:BD:DE |
| SubjectPublicKeyInfo | Public Key Algorithm:rsa Encryption RSA Public Key:(1024 bit) Modulus (1024 bit): 00:cc:ab:d1:01:02:03:4d:c4:55:c8:fe:89:44:a4:9c:a1:d8:09:fc:7e:d7:42:53: c7:7e:5b:83:61:3a:50:f2:08:7a:82:a9:cf:f9:36:be:83:b3:47:a5:3a:b9:e9:60: 6b:c7:59:b6:cf:39:79:9f:95:4e:7d:5d:4a:50:32:51:42:53:a9:d4:a2:86:4a:db: a6:55:a4:85:09:d3:ff:68:1d:cd:d3:f7:78:27:95:84:ec:de:57:5c:17:fe:e2:31:9 d:16:b0:6a:f5:65:7c:ca:ac:ac:59:81:36:e0:bf:a5:a3:1c:d2:7e:81:28:0b:34:3 9:7a:9a:9c:cd:01:4e:4e:57 Exponent:65537 (0x10001) |
| SubjectAltName | DNS:*.example.com, DNS:example.com |
| Public Key | RSA (1024 bits) [30 31 89 02 ... 03 01 00 01] |
| Key Usage | Digital Signature, Key Encipherment |
| ExtendedKeyUsage | TLS Web Server Authentication |
| X.509v3 CertificatePolicy | Policy: 9.8.7.6.5.4.3333.22.1 CPS: https://www.example.org/CPS |
| CRL Distribution Point | http://crl.examplecaissuer.com/1.crl |
| Pinning Indicator | HOSTNAME:www.example.com |
| Thumbprint | SHA-1 [ab cd de ... 88 99 aa] |
| Digital Signature | SHA-1 with RSA encryption [30 38 c3 d5 ... 88 18 53 f8] |

*Explicit Pinning Indicator* → (Pinning Indicator row)

FIG. 21

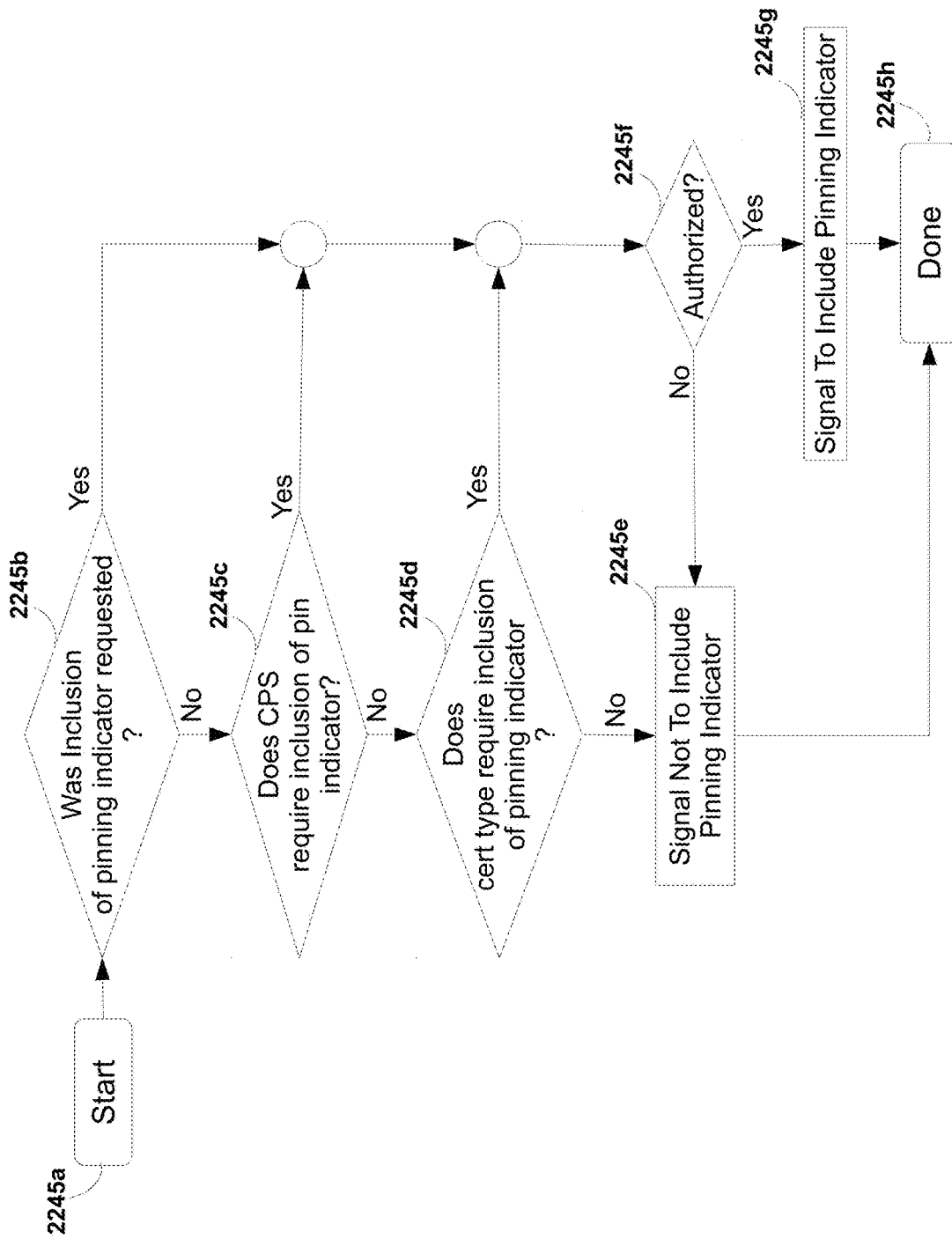

SECURE COMMUNICATIONS IMPROVEMENTS

FIELD

The present application generally relates to the field of communication. More specifically, at least one embodiment relates to improving secure communications.

BACKGROUND

Client applications communicating over the Internet are faced with the problem that any Certificate Authority (CA) may issue a certificate for any domain. Client applications (such as for example web browsers) and/or human users may face difficulty detecting such problems.

Pinning a domain to a peer has been introduced as a solution to this problem but may suffer from problems such as:
- requires additional operations for the domain or host operators to perform (e.g. to explicitly request the certificate pin)
- requires additional operations to be performed by an application vendor (such as for example web browser vendor). For example, operations to manage relationships with external entities
- additional interface or communications (typically out of band) between a domain or host and application vendors
- performance issues or delays during application startup managing or maintaining pin info Thus, various issues exist with certificate pinning, scalability issues in particular, and it might be advantageous to provide improvements.

BRIEF DESCRIPTION OF DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 3—illustrates a Digital Certificate, according to an embodiment.

FIG. 7—illustrates a Multiple Pins for a Domain, according to an embodiment.

FIG. 12—illustrates Examples of Pinning Indicators, according to an embodiment.

FIG. 15C—illustrates a Passive Mode Security Agent, according to an embodiment.

FIG. 15D—illustrates an Inline Mode Security Agent, according to an embodiment.

FIG. 16—illustrates a Ruleset, according to an embodiment.

FIG. 21—illustrates an Example of Digital Certificate Containing an Explicit Pinning Indicator, according to an embodiment.

FIG. 22B—illustrates a Determining Whether to Include Certificate Pinning Indicator, according to an embodiment.

DETAILED DESCRIPTION

Figure 1:
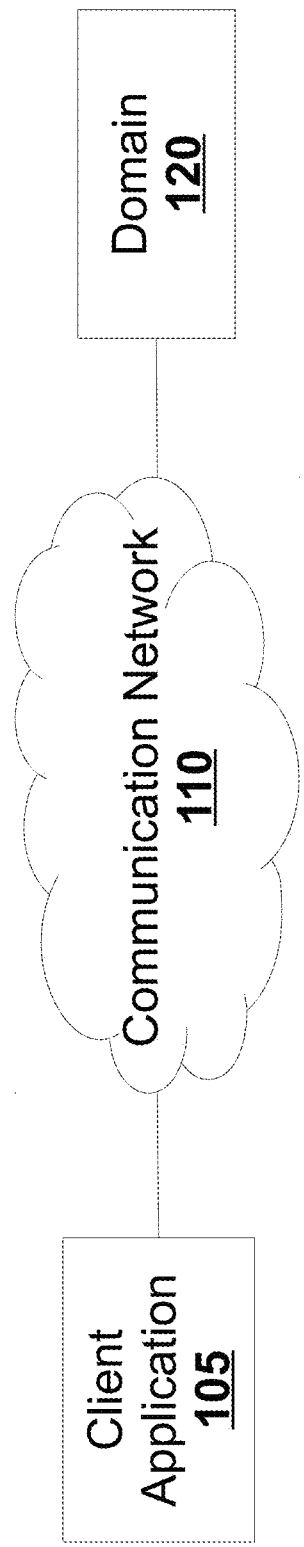
FIG. 1 illustrates a client application communicating with a domain over a communication network, according to an embodiment.

A server may make use of digital credentials to authenticate itself and facilitate secure communications on the Internet. The credentials may include digital certificates (such as for example X.509, or DNSSEC). Digital certificates may be discovered or provided using internal mechanisms (e.g. within the secure communication protocol such as for example SSL/TLS handshake), or obtained from external sources (e.g. retrieved from an external provider).

The digital certificate may be signed by a Certification Authority (CA) which clients have an embedded trust relationship with. Client applications may have trust relationships with multiple such CA's.

Certificate Path Construction:

A digital certificate (also sometimes referred to as certificate, or cert for short) may take the form of an electronic document that uses a digital signature to bind a public key with an identity. Digital certificate structures may contain data fields. Some certificate data fields are mandatory while others are optional extensions. Extensions may consist of an ObjectIdentifier (OID), a flag indicating criticality, and a value.

A relying party may refer to a user or agent that relies on the data in a certificate in making decisions. Relying party may use end-entity certificates for some express purpose (e.g. to authenticate a message originator and verify the integrity of the message by using the message originator's corresponding certificate to very a digital signature associated with the message).

An entity that signs a digital certificate may be referred to as a certificate issuer or simply issuer. Certificate Authority's (CA) may issue certificates. Certificates issued to Certification Authorities are sometimes referred to as CA certificates. Certificates issued to end-entities are sometimes referred to as end-entity certificates.

A trust anchor may refer to a CA certificate (or more precisely, the public verification key of a CA) may be used by a relying party for path validation (which may or may not be the same starting point for path construction as discussed further below). Trust anchors or Trusted Root CA Certificates may be self-signed.

A relying party may have one or more trust anchors. These trust anchors may be derived from a number of sources (such as for example the public key of a Trusted Root CA Certificate).

Collections of certificates may be stored together in what may be referred to as a "certificate store".

Certification path construction may involve the discovery of a "chain of certificates" between the end-entity certificate and a recognized trust anchor. Certificate paths may be constructed in the forward direction (for example from the end-entity certificate to a recognized trust anchor), or they may be constructed in the reverse direction (i.e., from a recognized trust anchor to the end-entity certificate).

One method certificate paths may be constructed is to use key identifier certificate extensions and recursively determine certificate signers until a trust anchor is reached. For example, X.509v3 provides AuthorityKeyIdentifiers and SubjectKeyIdentifiers, where the AuthorityKeyIdentifier (AKI) of a may be used to determine the issuer certificate with a matching SubjectKeyIdentifier (SKI), if the issuer isn't a trust anchor then the AuthorityKeyIdentifier of this issuer certificate is then used to determine another issuer certificate with a matching SubjectKeyIdentifier—and so on until a trust anchor is found. In other examples, authorityCertIssuer or authoritySerialNumber are used to construct certificate paths.

However, certificate path construction may involve other methods such as for example the use of Distinguished Names (DN's) (such as Subject DN, Issuer DN), Authority Information Access (AIA), Serial Numbers, IssuerUniqueID, SubjectUniqueID, or a combination of several certificate fields to uniquely identify issuers in order to construct certificate paths or validate certificate chains.

Peers:

Peer may refer to the entity being communicated with. In some instances, peer refers to the destination or receiver of one or more network messages. In some instances, peer refers to the origin or transmitter of one or more network messages. In some instances, a peer is a server, in other instances a peer is an intermediate entity such as a proxy, and in other instances a peer is a client. For example, a server may be the peer to the client. An entity may communicate with one or more peers simultaneously.

In some embodiments, peers are uniquely identified using one or more elements of a digital certificate such as for example: an encoding of a certificate, a public key, a SubjectPublicKeyInfo (SPKI), a Subject Distinguished Name (DN), a SubjectAltName, an Issuer Distinguished Name (DN), a SubjectKeyIdentifier (SKI), an AuthorityKeyIdentifier (AKI), an IssuerAltName, a SerialNumber, a SubjectUniqueId, an IssuerUniqueId, a signature, a Validity period, a CertificateRevocationList (CRL), a CertificateDistributionPoint (CDP), an OnlineCertificateStatusProtocol (OCSP), an AuthorityInformationAccess (AIA), or any derivation of the aforementioned.

In some embodiments, a peer is uniquely identified and represented in a 'PeerId' data structure (in C programming language code):

```
typedef struct PeerId {
void *Certificate;
void *PublicKey;
void *Validity;
void *Subject;
void *SubjectPublicKeyInfo;
void *SubjectKeyIdentifier;
void *SubjectAltName;
void *SubjectUniqueID;
void *Issuer;
void *AuthorityKeyIdentifier;
void *IssuerUniqueID;peer ident
void *AuthorityInformationAccess;
void *SerialNumber;
void *Signature;
};
```

And pinning information is represented in a 'PinnedInfo' data structure (also in C programming language code):

```
typedef struct PinnedInfo {
char *domain;
PeerId   peerIdentifiers[MAX_PEERIDS_PER_DOMAIN];
}
```

In some embodiments, determining a peer identifier consists of selecting a peer identifier related to a peer being communicated with.

In some embodiments, a peer identifier is a certificate, a field of a certificate, a derivation of a certificate, a derivation of a field of a certificate.

Security Agent:

Security agent refers to a component which performs or carries out one or more of the operations described herein. A security agent may evaluate various details in order to determine whether to perform a security operation (such as for example pinning operations). The security agent may be a computing device. The security agent may be standalone, contained within another component, integrated with a system, interact with other components, instruct or guide other components, or other. The security agent may be implemented in a variety of components such as for example a network device, a client device, a server device, a web proxy, a client application, a web browser, a web browser extension, a web browser add-on, a client device, a smartphone, a network gateway, a security device, a firewall, a device attached to a computer, an embedded device, a watch, an Internet device, a remote service, computer network device, network interface, or other network capable component.

In some embodiments, a security agent performs operations automatically. In some embodiments, a security agent performs operations dynamically. In some embodiments, a security agent performs operations in a live environment.

In some embodiments, a security agent influences or manipulates network messages.

In some embodiments, a security agent pins a domain to a certificate used in authenticating the domain based on whether a communication element in communicating with the domain provides a pinning indicator.

In some embodiments, a security agent pins a domain to a certificate used in authenticating the domain based on the existence of a pinning indicator within a communication element in communicating with the domain.

In some embodiments, a security agent pins a domain to a certificate used in authenticating the domain based on whether a certificate has a pinning indicator.

In some embodiments, a security agent pins a domain to a certificate used in authenticating the domain based on whether a certificate provides a pinning indicator.

In some embodiments, a security agent pins a domain to a certificate used in authenticating the domain based on a pinning indicator provided by (either explicitly, or implicitly) by a certificate issuer.

In some embodiments, a security agent pins a domain to a certificate based on examining the certificate chain used to authenticate an entity, and determining whether a certificate in the certificate chain indicates to pin the domain to a certificate in the certificate chain. The indicator may be explicitly present (such as within a certificate, or protocol), or implicitly determined. Implicitly determining an indicator may consist of one or more of the following:

- determining whether the issuer of one or more certificates in a certificate chain are an authorized pinning issuer
- determining whether a certificate contains a specific Object Identifier (OID) such as for example an Extended Validation (EV) OID
- determining whether a certificate is deemed as an Organization Validated (OV) certificate type
- determining whether the Certificate Practice Statement (CPS) is an authorized CPS Explicit indicators may include a specific ObjectIdentifier (OID), or a specific detail within a Certificate Practice Statement (CPS), or specific indication within a communication protocol.

In some embodiments, a security agent automates pinning of a domain to a peer identifier by determining whether a pinning indicator is present.

In some embodiments, a security agent detects a pinning indicator anywhere within a certificate chain. In some embodiments, a security agent pins to a certificate that has provided a pinning indicator (regardless of whether the pinning indicator was provided intentionally or not). In some embodiments, a security agent pins to a certificate other than the certificate that contains the pinning indicator (e.g. issuer certificate has explicit pinning indicator but security agent pins to the end entity certificate).

In some embodiments, certificate issuer information is used to determine whether to pin a domain to a certificate.

Secure Communication Channel

In some embodiments, a security agent performs operations with secure communication channels involving digital certificates such as for example: Secure Sockets Layer (SSL), or Transport Layer Security (TLS).

In some embodiments, a security agent performs operations related to a secure communication channel authenticated using digital certificates (such as for example be a Secure Sockets Layer (SSL), or Transport Layer Security (TLS)).

In some embodiments, a secure communications channel involves the setup of a communications channel that uses digital certificates to secure communications.

In some embodiments, a security agent performs operations on a certificate capable session such as for example SSL or TLS sessions.

Pinning Information:

Pinning information may refer to any communication related details, factors, elements, or properties related to network communications.

In some embodiments, pinning information is implemented as a white list of allowed or acceptable peers.

In some embodiments, parts of the pinning information are manually pre-determined.

In some embodiments, pinning information may consist of relationship or associations between communication details. For example, pinning information may consist of data and their relationships such as: domains, peers, hosts, hostnames, certificates, certificate chains, network protocol details, or other communication related data. Another example, pinning information consists of the relationship between a domain and a certificate used to authenticate the domain.

In some embodiments, pinning a domain to a certificate involves storing in a storage medium, a relationship indication between the domain and the certificate used to authenticate the domain to allow for later retrieval of the relationship indication. The relationship indication may involve any form of linking, associating, grouping, categorizing, or otherwise relating between the domain and the certificate used to authenticate the domain. For example, a security agent determines a pin for a domain to a certificate and records the domain, the certificate, and the pin information into memory for either the security agent or a web browser to enforce the pin.

In some embodiments, pinning a domain to a certificate involves storing in a storage medium, a relationship indication between the domain and a field of the certificate used to authenticate the domain to allow for later retrieval of the relationship indication. The relationship indication may involve any form of linking, associating, grouping, categorizing, or otherwise relating between the domain and the field of the certificate used to authenticate the domain. For example, a security agent determines a pin for a domain to a field of the certificate and records the domain, the field of the certificate, and the pin information into memory for either the security agent or a web browser to enforce the pin.

In some embodiments, pinning a domain to a peer identifier involves storing in a storage medium, a relationship indication between the domain and the peer identifier of the certificate used to authenticate the domain to allow for later retrieval of the relationship indication. The relationship indication may involve any form of linking, associating, grouping, categorizing, or otherwise relating between the domain and the peer identifier. For example, a security agent determines a pin for a domain to a peer identifier and records the domain, the peer identifier, and the pin information into memory for either the security agent or a web browser to enforce the pin.

In some embodiments, storing a pin involves storing relationship information between a domain and either a certificate or a peer identifier such that the relationship can be retrieved to enforce pins.

In some embodiments, pinning information is recorded into a storage device. In some embodiments, pinning information is made available to other entities.

Dynamic Pinning:

In some embodiments, pinning information is determined dynamically by a security agent and the resulting information is stored for later use. For example, a security agent determines pinning information consisting of a domain and a certificate, the security agent stores this, and a client application uses this information to enforce the pin.

In some embodiments, pinning is automatically performed without explicit signals or indications by an entity (such as for example: a domain, a certificate authority).

In some embodiments, pinning information is inferred from details found within network communications. Inference details may be found within a certificate, a chain of certificates, a communication protocol, or other communication details with a peer.

FIG. 1 illustrates a client application 105 communicating with a domain 120 over a communication network 110. The communication network may be the Internet. Communications may include secure communications such as Secure Socket Layer (SSL) or Transport Layer Security (TLS).

Figure 2:
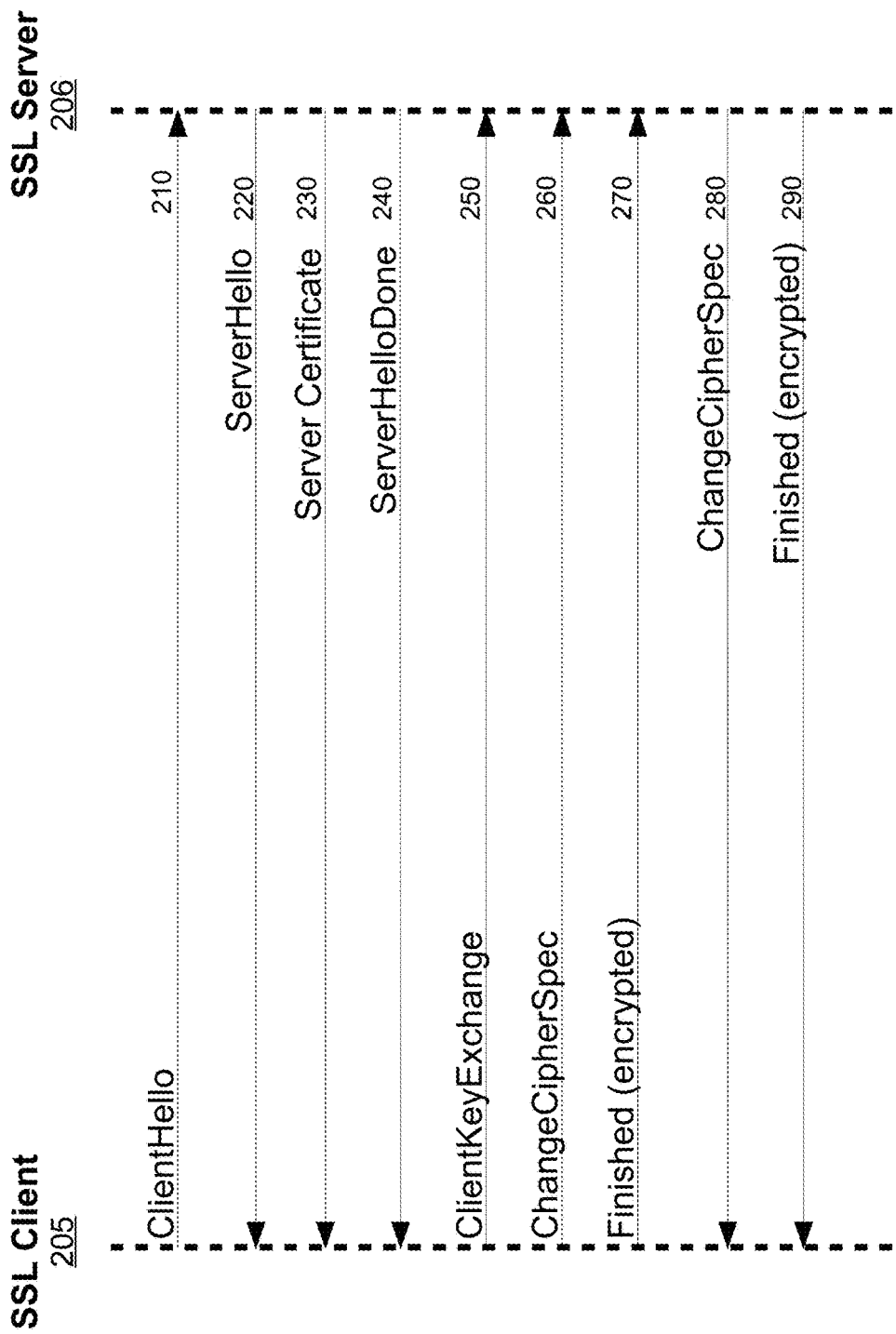
FIG. 2—illustrates a SSL/TLS Handshake, according to an embodiment.

FIG. 2 illustrates a sequence diagram of the initiation of a secure communication channel between a SSL Client 205 and a SSL Server 206 using a SSL/TLS Handshake. The SSL Client 205 sends a ClientHello request 210 to the SSL Server 206. The SSL Server 206 responds with a ServerHello message 220 followed by a Certificate message containing the servers SSL certificate (possibly along with a certificate chain) 230 followed by a ServerHelloDone message 240. The SSL client 205 may optionally respond with a ClientKeyExchange message 250 followed by a ChangeCipherSpec 260 followed by a Finished message 270. The server responds with a ChangeCipherSpec 280 and a Finished message 290. Once authentication is successful and the client obtains the server SSL certificate provided in operation 230 one or more elements of the certificate may be used by a security agent to identify a peer as further discussed herein, e.g., with reference to the other figures.

FIG. 3 illustrates an example of portions of an X.509 digital certificate (some mandatory fields may not be present). Each row represents a data field. Digital certificates include but are not limited to X.509 certificates.

Figure 4:
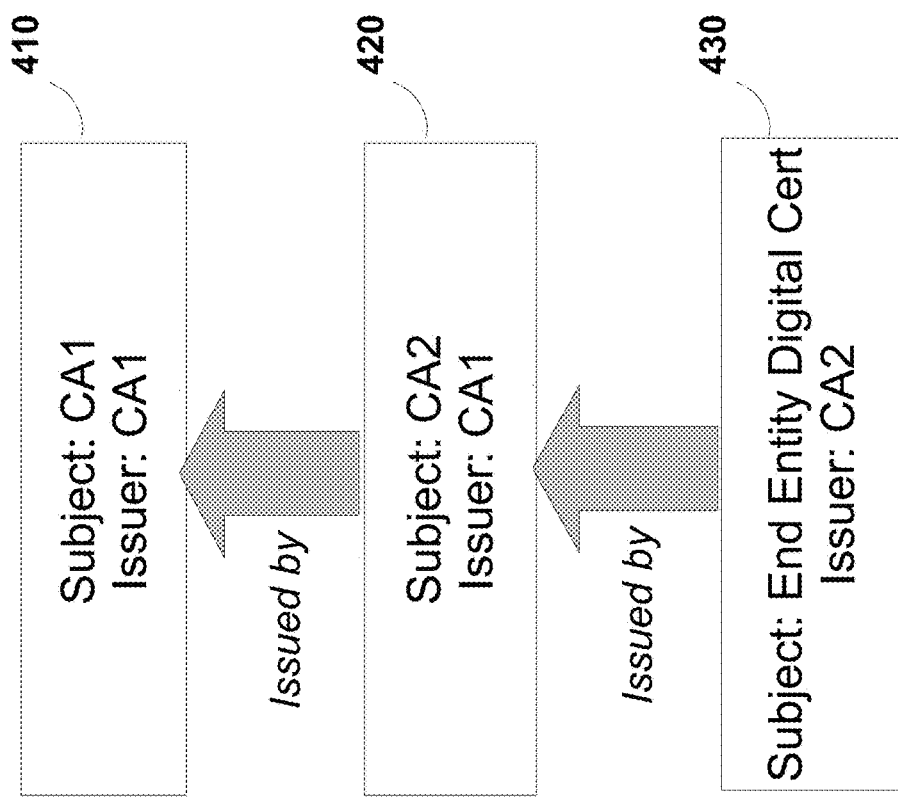
FIG. 4—illustrates a Digital Certificate Chain, according to an embodiment.

FIG. 4 illustrates an embodiment use of a chain of certificates where each certificate is signed by an issuer. The "End Entity Digital Cert" 430 is digitally signed by "CA2" 420 which in turn is digitally signed by "CA1" 410. In this example, if the "CA1" certificate is a trust anchor or Trusted Root CA Certificate, then the certificate chain may validate (if the other factors in certificate chain validation are sufficed).

Figure 5:
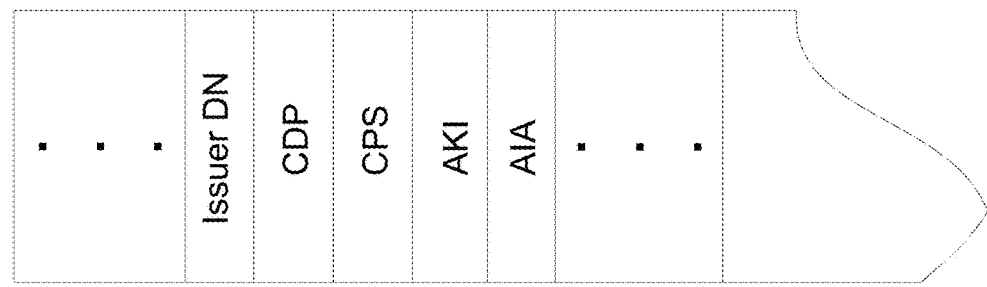
FIG. 5—illustrates a Certificate Issuer Information, according to an embodiment.

FIG. 5 illustrates an embodiment of some of the possible issuer information within a digital certificate.

Pinning:

In some embodiments, a security agent pins a domain to a certificate used in authenticating the domain based on a pinning indicator provided by (either explicitly, or implicitly) by a certificate issuer.

In some embodiments, a security agent pins a domain based on information related to issuer information.

In some embodiments, pinning a domain to a certificate involves: determining a certificate to pin to (typically one of the certificates used to authenticate the domain), determining a peer identifier of the determined certificate, storing a relationship between the domain and the peer identifier.

In some embodiments, a security agent creates a pin by storing a relationship between the domain and a certificate used to authenticate the domain.

In some embodiments, a security agent updates a pin by storing a new relationship between the domain and a certificate used to authenticate the domain.

In some embodiments, a security agent replaces a pin by overwriting a relationship between the domain and a certificate used to authenticate the domain.

Pin Storage:

Pins may be written to, saved to, or stored in any kind of storage medium (such as for example: a database, disk, cache, memory, repository, in-memory data structure, shared memory, or other data storage medium).

Figure 6:
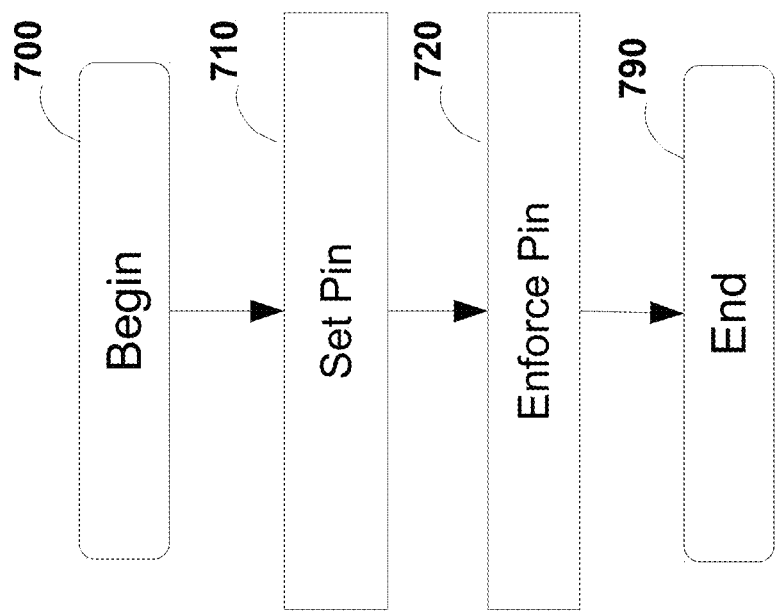
FIG. 6—illustrates a Pinning, according to an embodiment.

FIG. 6 illustrates an overview flowchart diagram of an embodiment performing pinning A domain is pinned to one or more peers 710 after which the pins are enforced 720. The setting of a pin may be performed outside of or in addition to a communication session with a peer, or the setting may be performed live or during a communication session with a peer. The setting of a pin may involve storing of one or more of: a domain, a certificate, a peer identifier, a relationship indicator between a domain and a certificate, a relationship indicator between a domain and a peer identifier, or any other pinning related information. A relationship indicator may include a linking, association, or other relationship mechanism between two or more data items. The operations of 710 and 720 may or may not be performed by different entities or components.

FIG. 7 illustrates an example of an embodiment of a table containing multiple pins for a domain. The 'Domain' column specifies the domain name being pinned, while the 'Peer Identifier' column specifies a certificate element and value (separated by a colon ':'). A domain may be pinned to one or more peers, or to one or more peer identifiers of the same peer. Multiple domains may pin to the same peer. A peer may be uniquely identified such as for example one or more of: an encoding of a certificate, a public key, a SubjectPublicKeyInfo (SPKI), a Subject Distinguished Name (DN), a SubjectAltName, an Issuer Distinguished Name (DN), a SubjectKeyIdentifier (SKI), an AuthorityKeyIdentifier (AKI), an IssuerAltName, a SerialNumber, a SubjectUniqueId, an IssuerUniqueId, a signature, a Validity period, a CertificateRevocationList (CRL), a CertificateDistributionPoint (CDP), an OnlineCertificateStatusProtocol (OCSP), an AuthorityInformationAccess (AIA), or any derivation of the aforementioned.

Figure 8:
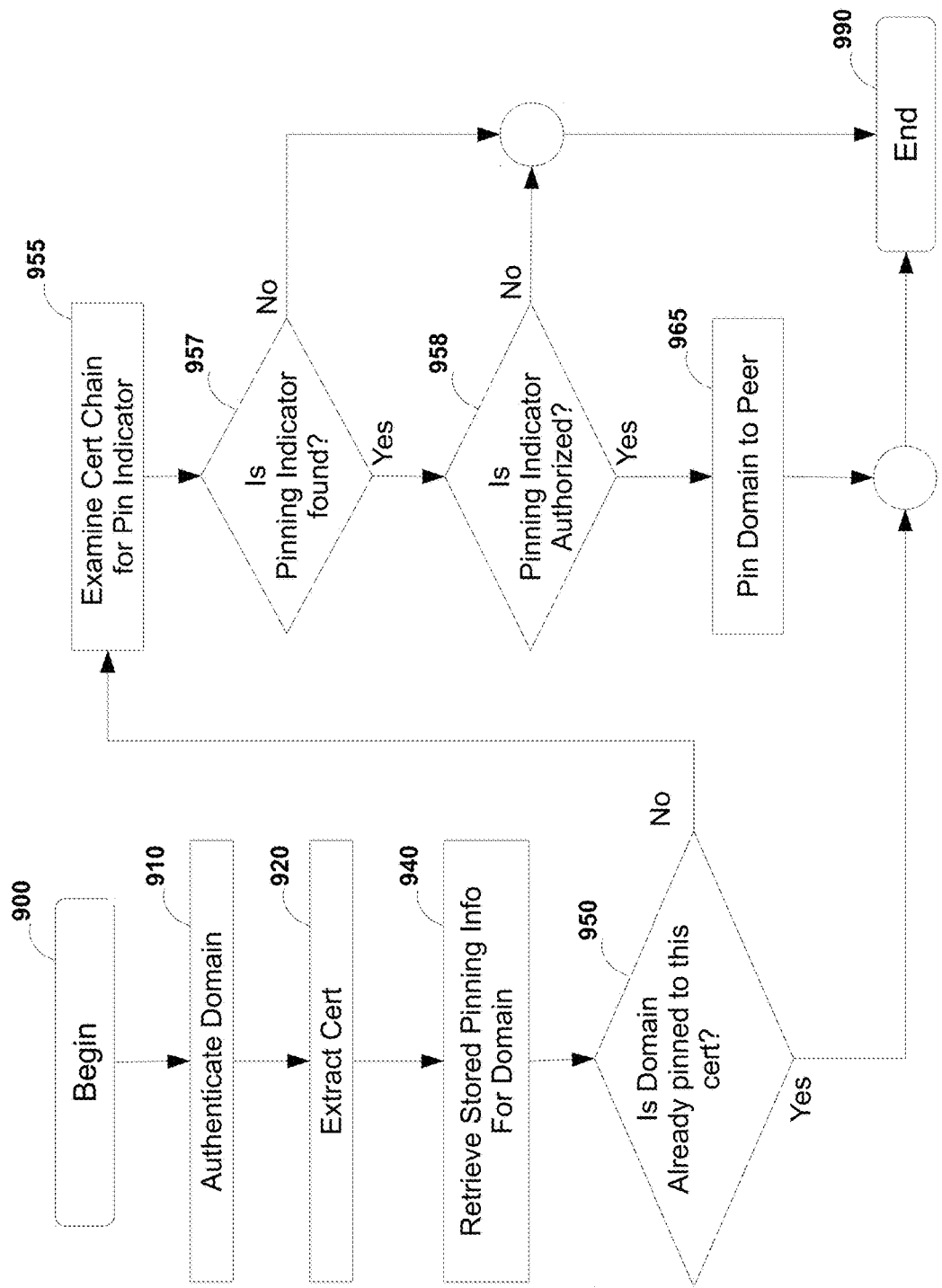
FIG. 8—illustrates a Determining Whether to Set a Pin, according to an embodiment.

FIG. 8 illustrates a flowchart diagram of an embodiment for pin setting operation 710 from FIG. 6 in greater detail. The process begins 900 and a domain is authenticated 910 which may include one or more certificates in a certificate chain. After which, a certificate is extracted 920. The stored pinning information for the Domain is retrieved 940 and used to determine whether the domain is already pinned to this certificate 950. If 950 determines Yes, then the process finishes 990. However, if the determination 950 determines No, then the certificate chain is examined for a pinning indicator 955 and if pinning indicator is found 957 then a check is made to determine whether the pinning indicator is an authorized pinning indicator 958. If operation 958 determines that it is an authorized pinning indicator then the domain is pinned to the peer 965 and the process finishes 990. Operation 965 may involve selecting a certificate to pin to (typically one of the certificates used to authenticate the domain), determining a peer identifier of the selected certificate, and storing a relationship between the domain and the peer identifier. If a pinning indicator was not found or detected at operation 957 or it is not an authorized pinning indicator 958, then the connection is dropped 960 before finishing 990.

Figure 9:
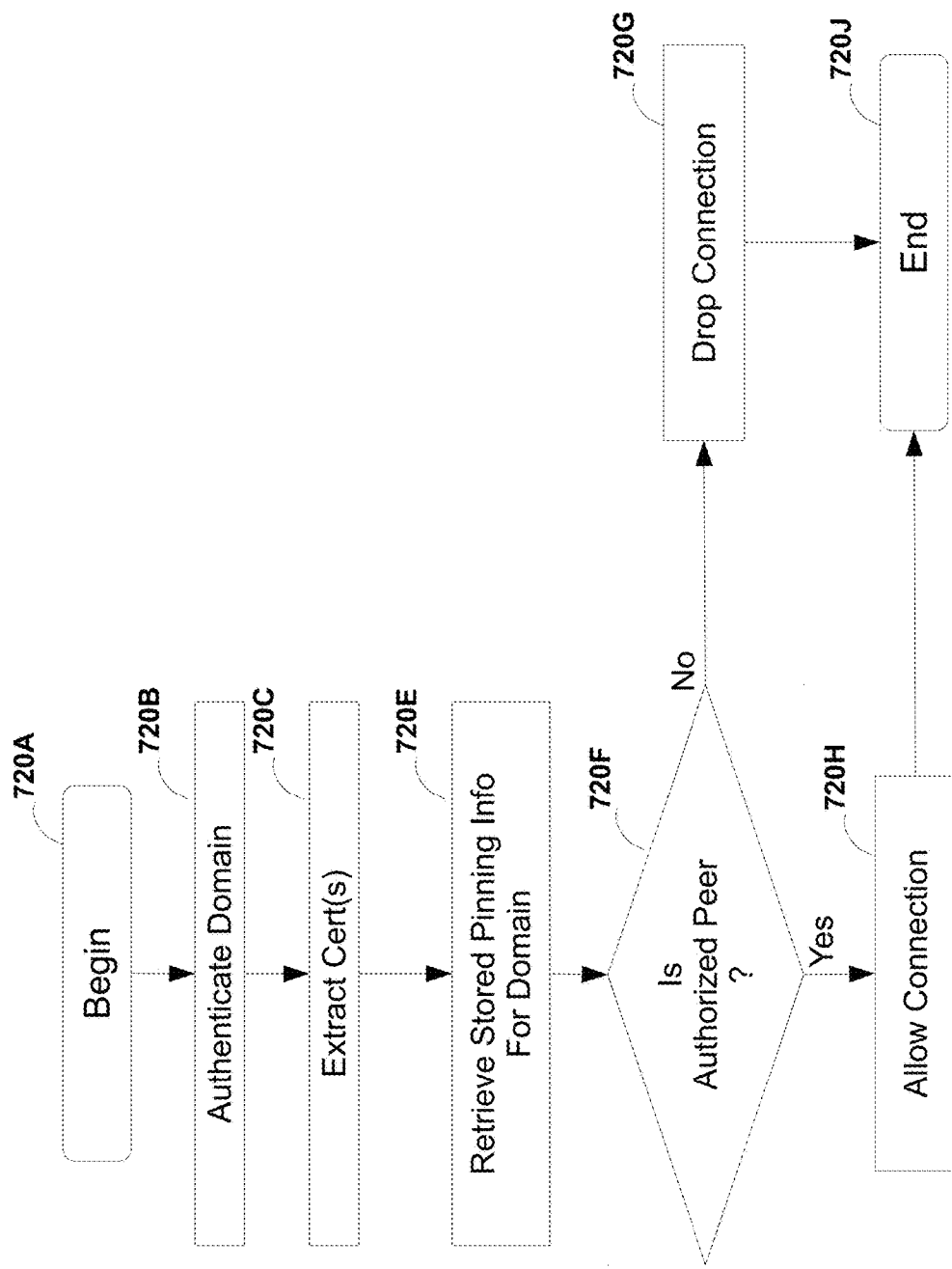
FIG. 9—illustrates an Enforcement of Pins, according to an embodiment.

FIG. 9 illustrates a flowchart diagram of an embodiment for pin enforcement operation 720 from FIG. 6 in greater detail. The process begins 720A and the domain is authenticated using a secure communication channel (such as for example SSL/TLS) 720B followed by extracting one or more certificates 720C of the authenticated peer. Stored pinning information is retrieved for the domain 720E and used to determine whether it is an authorized peer 720F. If the determination at 720F results in No, then the connection is dropped 720G and finished 720J. If the determination at 720F results in Yes, then the connection is allowed to proceed 720H and finished 720J.

Figure 10:
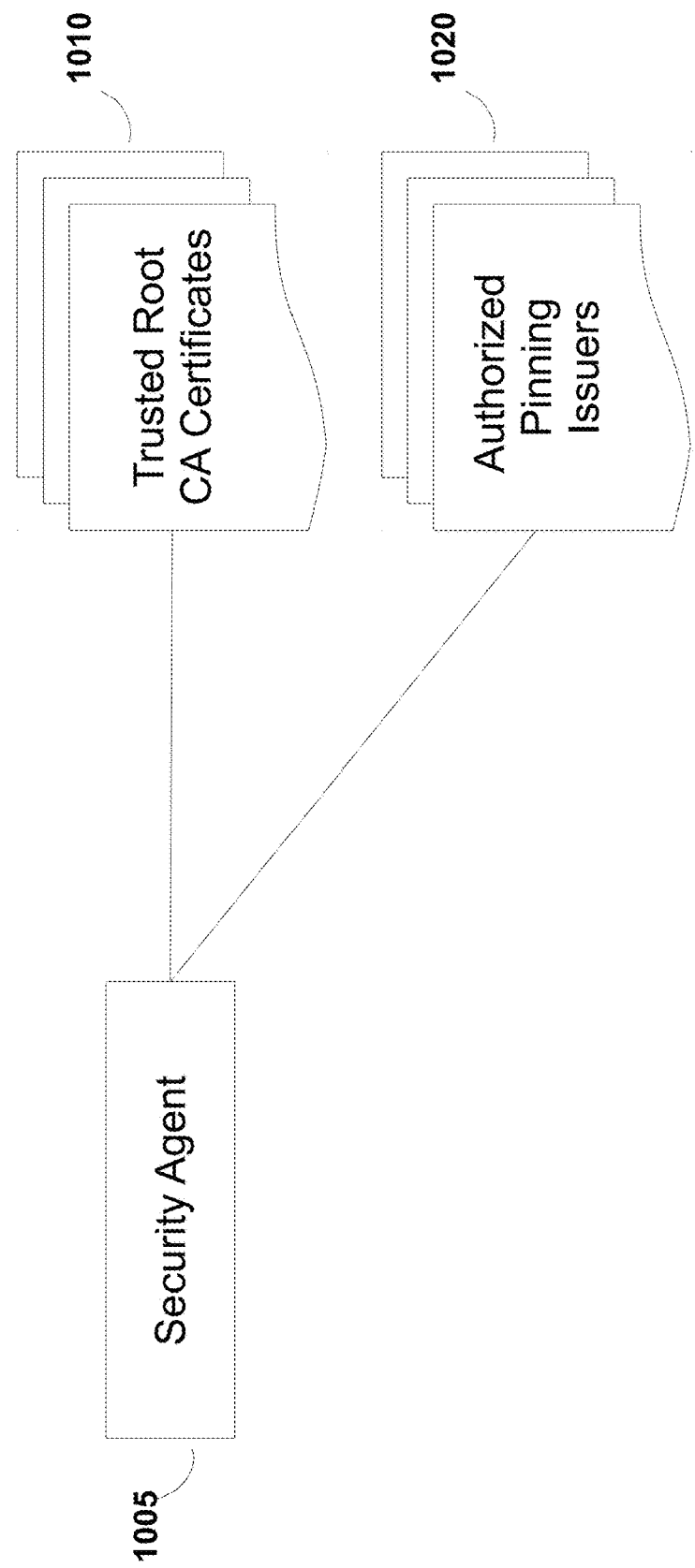
FIG. 10—illustrates an Authorized Pinning CA's Different From Trusted Root CA Certificates, according to an embodiment.

FIG. 10 illustrates an embodiment where a Security Agent 1005 accesses one or more Authorized Pinning Issuers 1020 that are separate from one or more Trusted Root CA Certificates 1010.

Figure 11:
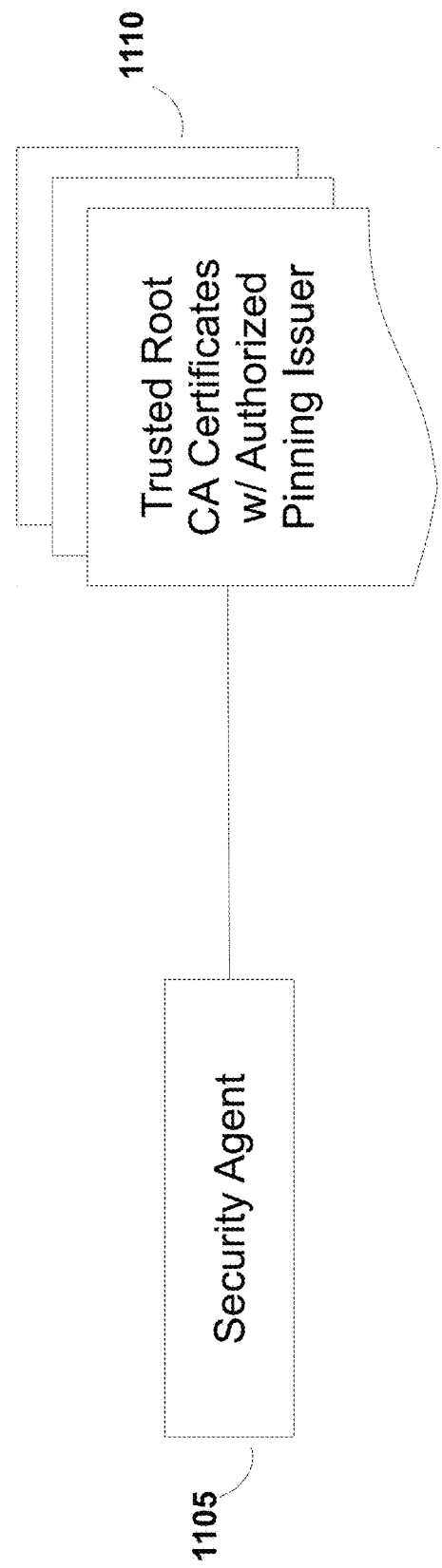
FIG. 11—illustrates an Authorized Pinning CA's Embedded Within Trusted Root Certificates, according to an embodiment.

FIG. 11 illustrates an embodiment where a Security Agent 1105 accesses one or more Authorized Pinning Issuers that are the same as one or more Trusted Root CA Certificates 1110 and each Trusted Root CA Certificate is flagged as to whether it is an Authorized Pinning Issuer.

Pinning ObjectIdentifier (OID):

In some embodiments, a new ObjectIdentifier (OID) is registered or set aside that is used to signal an application to perform pinning A Certificate Authority may add or include the OID within a certificate. An application may include one or more of: a web browser, a web browser extension, a web browser add-on, a web proxy, a SecureSocketLayer (SSL)/ TransportLayerSecurity (TLS) application, a network gateway, a firewall, a security device, an Internet connected device, a device connected to a computer, or other networking component.

Pinning Indicator:

Pinning indicators may be found within a certificate, protocol, communication channel, or other.

A pinning indicator may be implicit or explicit. An implicit pinning indicator may exist or be present due to normal circumstances of secure communications. An explicit pinning indicator may exist due to a specific action or operation taken to include or provide it. An example of an explicit pinning indicators is a certificate extension identified by a specific OID (and optionally with an extension value containing a Domain name). Another example of an explicit pinning indicator is a new X.509 certificate standard which includes a mandatory field used to indicate a certificate may be used to set a pin.

A pinning indicator may exist within a certificate, within a certificate within a certificate chain, within a network protocol, a communicating peer, or other element related to communicating. Another example, a security agent pins a domain to a peer when it detects any certificate within a certificate chain contains one or more pinning indicators. Another example, a security agent pins a domain to a peer when it detects any certificate within a certificate chain contains a specific ObjectIdentifier (OID) pinning OID.

In some embodiments, a client application examines a certificate for a pinning indicator, and when found, the client application determines or selects a peer identifier and pins a domain to the peer identifier.

In some embodiments, one or more digital certificates are examined to detect indications of whether to pin a domain to one or more of the digital certificates.

In some embodiments, a pinning indicator is determined from a Certificate Practice Statement (CPS). For example, a security agent examines the CPS for a certificate and detects a pinning indicator within the CPS.

In some embodiments, a pinning indicator is a signal, message, bit, semaphore, indicia, flag, or other indication.

In some embodiments, a pinning indicator is derived from a network communications detail such as for example: a secure communications channel, authentication information, domain, or other network communication element.

In some embodiments, a security agent searches for the presence of a pinning indicator in any certificate in a certificate chain used to authenticate a domain.

In some embodiments, the presence of a valid Extended Validation (EV) ObjectIdentifier (OID) within a certificate is deemed a pinning indicator. Each Certificate Authority (CA) may have it's own unique EV OID that a security agent detects within a certificate.

In some embodiments, a security agent maintains or has access to one or more authorized pinning issuers. The security agent examines certificate issuers for whether they are one of the one or more authorized pinning issuers—and if so, it pins the domain to one of the certificates.

In some embodiments, a security agent determines whether a certificate in the certificate chain used to authenticate an entity contains a specific ObjectIdentifier (OID), where the specific OID indicates to pin a domain to a certificate in the certificate chain.

In some embodiments, a security agent examines Certificate Practice Statements (CPS) for an indication to perform a pinning operation. For example, a security agent monitors SSL/TLS communications, examines the certificate chain used to authenticate a domain, and examines the referenced CPS for whether it references or indicates pinning.

In some embodiments, a pinning indicator consists of a signal from a certificate issuer. The signal may or may not be intentionally designed as a pinning indicator. For example, the signal may be certificate issuer information that was placed in the certificate for certificate validation purposes.

FIG. 12 illustrates an example of a table containing Pinning Indicators, their type, and where found. A pinning indicator may be explicitly defined, or determined implicitly. The pinning indicator may exist within a certificate, SSL/ TLS protocol, communication related element, or other. An example of an explicit pinning indicator is identified through use of a defined pinning indicator ObjectIdentifier (OID).

Use of Issuer Information:

Digital certificates contain various fields and extensions, some of which provide certificate issuer information. The certificate issuer information may assist with certificate path construction and/or certificate chain validation. Certificate fields or extensions that provide certificate issuer information may include Issuer DN, key identifiers (such as AuthorityKeyIdentifier, SubjectKeyIdentifier), Authority Information Access (AIA), or other. In some embodiments, a security agent uses certificate issuer details for the purpose of pinning. This may be in addition to certificate path construction and certificate chain validation.

In some embodiments, a security agent uses certificate issuer information for pinning a domain to a certificate—in addition to the certificate chain validation as the certificate issuer information was designed for. For example, a security agent examines one or more certificates used to authenticate a domain, and when a pinning indicator is detected, the security agent pins the domain to one of the certificates.

In some embodiments, when a security agent detects the presence of an authorized pinning issuer as the certificate issuer of one of the certificates used to authenticate a domain, it pins the domain to one of the certificates.

In some embodiments, when a security agent detects a pinning indicator in one of the certificates used to authenticate a domain, it pins the domain to one of the certificates. The pinning indicator may include the presence of an authorized pinning issuer as the certificate issuer of one of the certificates used to authenticate the domain.

In some embodiments, a security agent uses issuer information of a certificate for the purpose of determining whether to pin a certificate to a domain. This may be in addition to using the issuer information for certificate path validation.

In some embodiments, a security agent considers certificate issuer information independent from certificate path validation. Success or failure of certificate path validation may be different from using the same certificate issuer information for pinning purposes.

Figure 13:
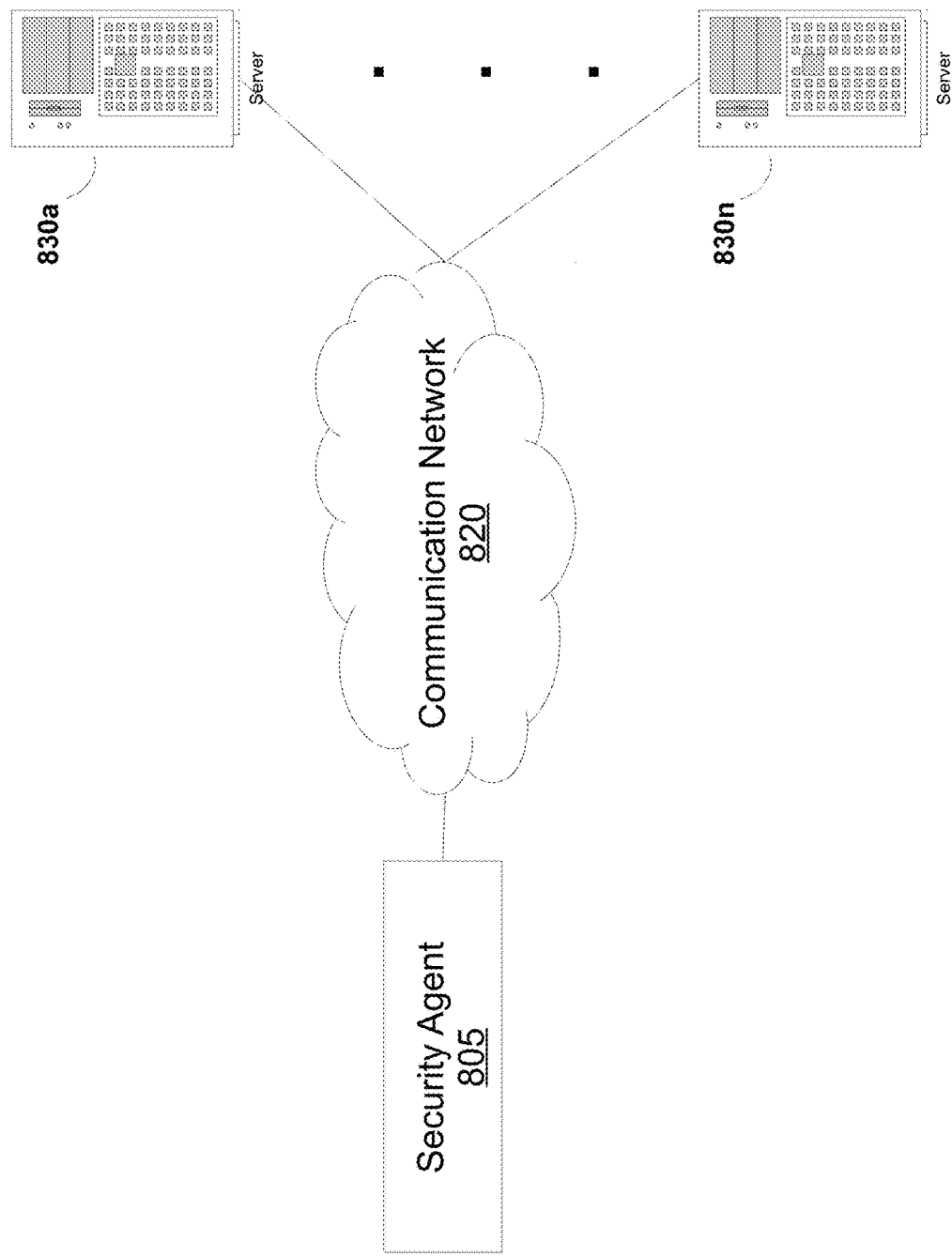
FIG. 13—illustrates a Security Agent Network View, according to an embodiment.

FIG. 13 illustrates a network view of an embodiment of a security agent communicating with one or more domains. The security agent 805 performs security operations. 820 is a communication network the Security Agent 805 uses to communicate with multiple domains (such as for example 830*a* and 830*n*).

Figure 14:
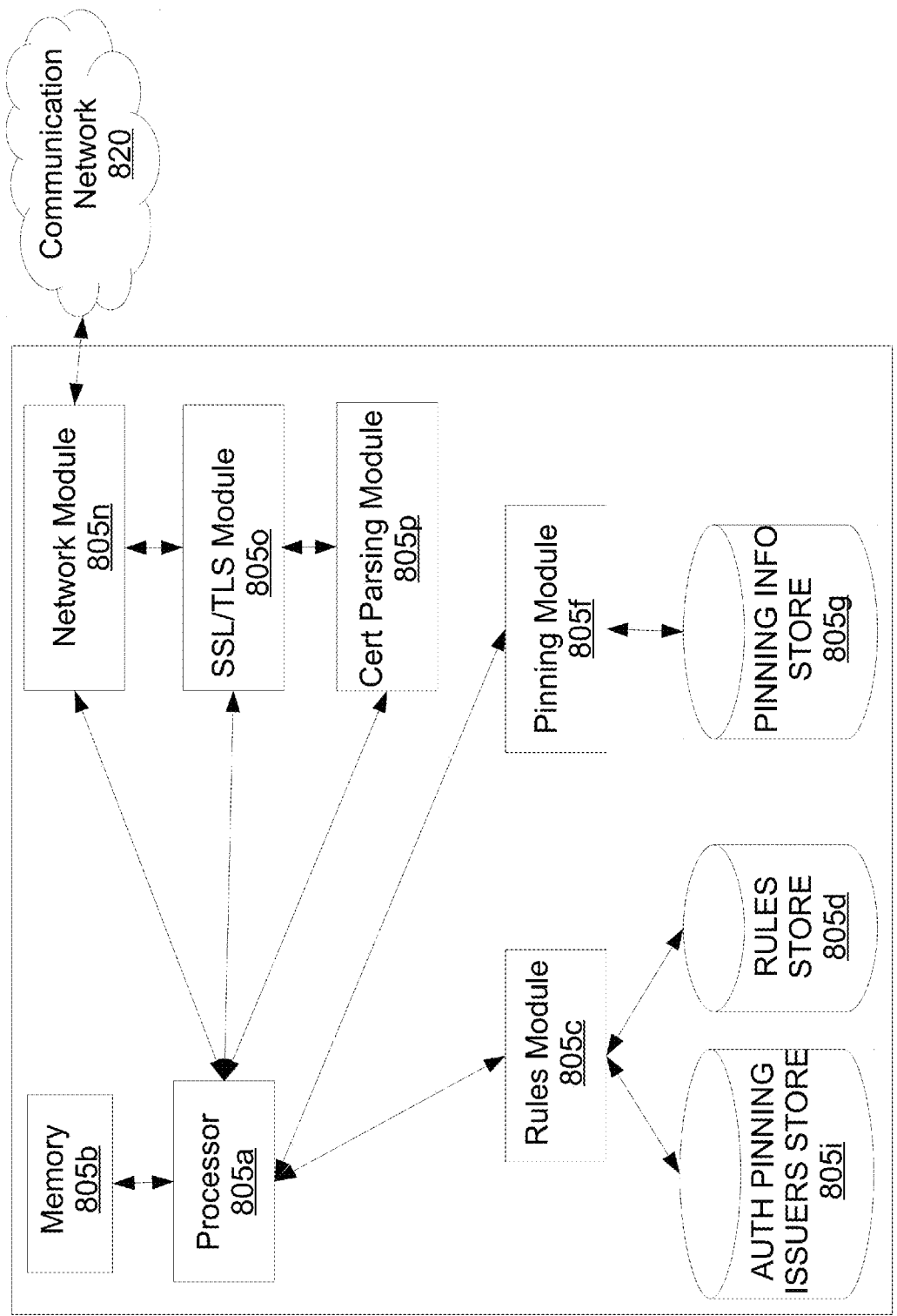
FIG. 14—illustrates a Security Agent System, according to an embodiment.

FIG. 14 illustrates a system view of an embodiment of a security agent. The Processor 805*a* co-ordinates the various components to evaluate details and determine pinning operations. The Memory 805*b* is used to store data and/or instructions. The Rules Module 805*c* uses rules from the Rules Store 805*d* and/or Authorized Pinning Issuers from the Authorized Pinning Issuers Store 805*i* to make a determination of whether to pin a domain. The Pinning Module 805*f* stores and retrieves pinning information from the Pinning Info Store 805*g*. The Network Module 805*n* interfaced with the Communications Network 820. The communication Network 820 may be the Internet. The SSL/TLS Module 805*o* carries out SSL/TLS communications. The Cert Parsing Module 805*p* parses and extracts certificates and certificate chains (such as from the SSL/TLS communications).

Figure 15A:
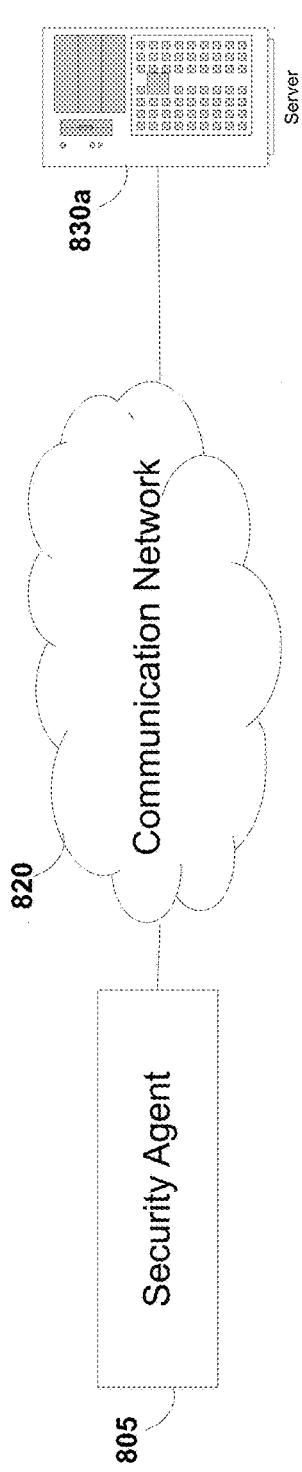
FIG. 15A—illustrates a Security Agent, according to an embodiment.

FIG. 15A illustrates a network view of embodiments of a Security Agent. The Security Agent 805 communicates over a communication network 820 with a Domain 830*a*.

Figure 15B:
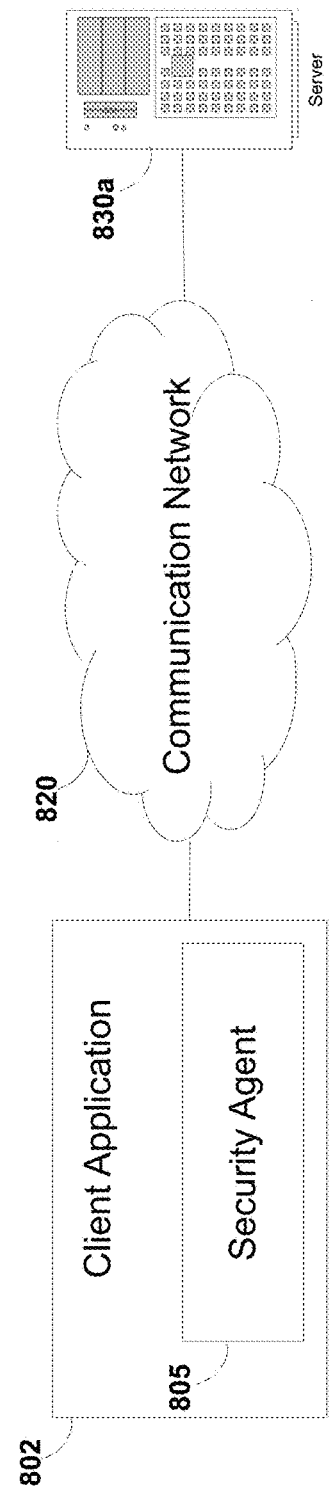
FIG. 15B—illustrates a Security Agent Embedded in Client Application, according to an embodiment.

FIG. 15B illustrates a network view of an embodiment of a Security Agent embedded within a Client Application. The Security Agent 805 is embedded within the client application 802 such that it has access to network communications that the client application 802 has with the Domain 830*a* over the communication network 820. For example, the Client Application 802 is a web browser and the Security Agent is a web browser extension or add-on. Another example, a security agent 805 is integrated into a client application 802.

FIG. 15C illustrates a network view of an embodiment where a network Security Agent operates in passive mode. The client application 802 and the Security Agent 805 communicates over a communication network 820. The Security Agent 805 passively monitors communications and provides guidance to the client application 802, or otherwise manipulates network communications passively.

FIG. 15D illustrates a network view of an embodiment where a network Security Agent operates in inline mode. The Security Agent 805 processes communications between the client application 802 and the communications network 820 thus allowing the Security Agent 805 to intercept and possibly manipulate network communications between the client application 802 and a domain 830*a*.

FIG. 16 illustrates an instance of a set of rules used by some embodiments of a security agent to determine whether to perform an action. A peer may be uniquely identified. Pinning a domain to a peer may be one action performed. In some embodiments, the rules are configurable by an entity (such as for example an enterprise admin). In some embodiments, the security agent uses one or more pre-defined rules. Each row in the table specifies a Rule. The Rule # column uniquely identifies the rule. The Data Field column refers to the data field to examine of certificates. The Function column refers to executable code to be carried out to evaluate the rule. Different embodiments may implement the Function column in different manners. The Acceptable Values column refers to the conditions that satisfy or exceeds expectations when the Function is evaluated. The Acceptable Values column may consist of a single value, multiple values, a range of values, min/max limits, or other representation of acceptable conditions. The Action column can specify the action to take if Acceptable Values are met. In this example, the isPresent( ) function takes two parameters—the second parameter defines a list of one or more items to examine whether the first parameter exists or is present within—and returns a binary (e.g. TRUE or FALSE). In this example, the isNull( ) function returns a binary indicating whether the parameter is null or not. In this example, the containsOID( ) function takes two parameters—the first parameter defines a data structure to examine (typically an X.509v3 certificate), and then returns a binary (TRUE or FALSE) indicating whether the second parameter is present within the first. In this example, the firstSeen( ) function takes one parameter that specifies a certificate, and looks up in a data store how long ago the certificate was first seen, and returns that value (in days).

Figure 17:
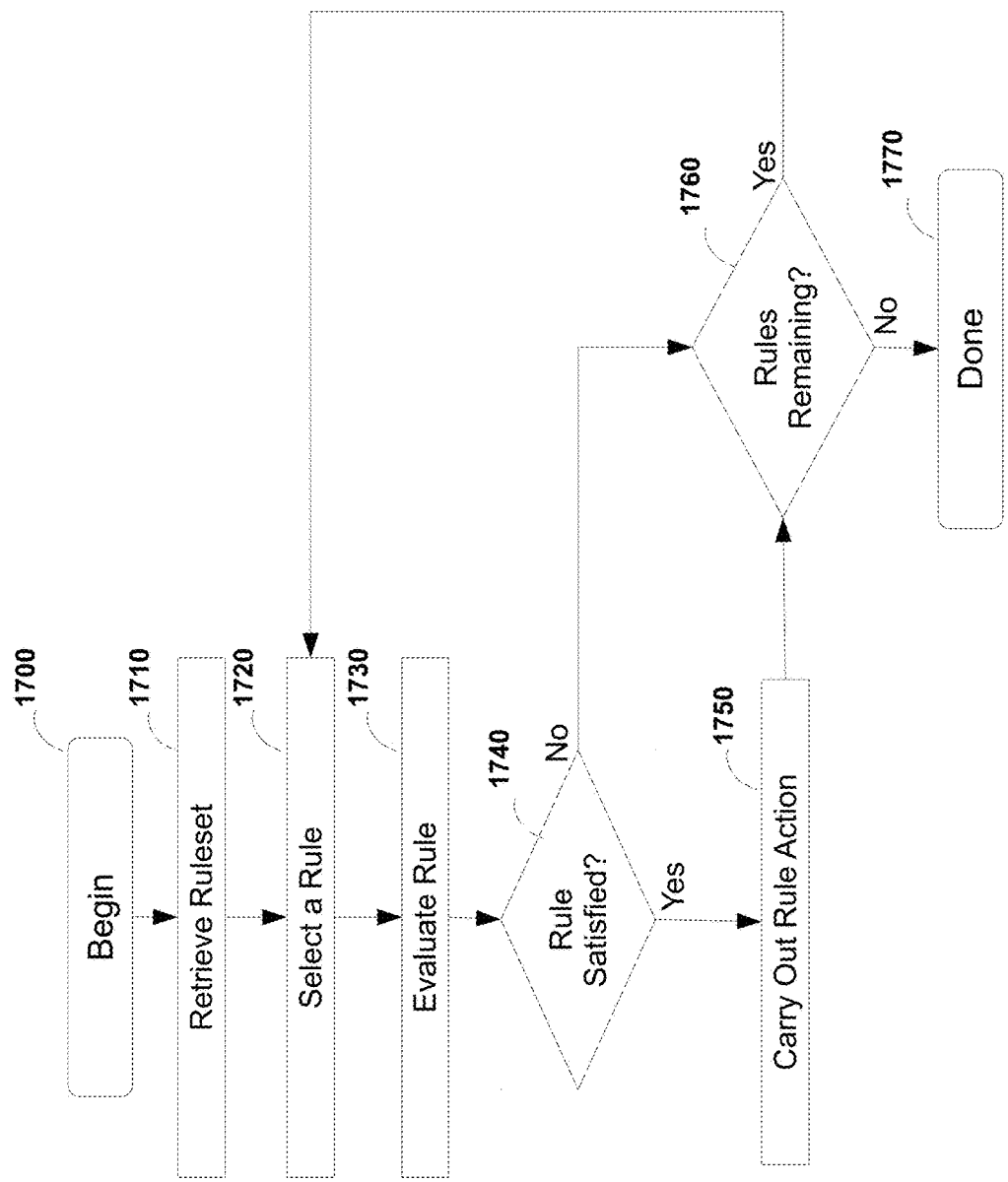
FIG. 17—illustrates a Ruleset Evaluation, according to an embodiment.

FIG. 17 illustrates a flowchart view of the operations to evaluate a ruleset. The process begins at 1700 and retrieves a ruleset at 1710. A rule is selected from the ruleset 1720. The peer is evaluated using the rule 1730 and a determination is made whether the peer satisfied the rule 1740. If the rule was satisfied at operation 1740, then the rule action is carried out 1750. After operation 1750, or if the rule was not satisfied at operation 1740, then next it determined whether there are any more rules remaining in the ruleset to evaluate 1760. If at operation 1760 it is deemed there are rules remaining to evaluate, then operation 1720 is carried out next.

Figure 18:
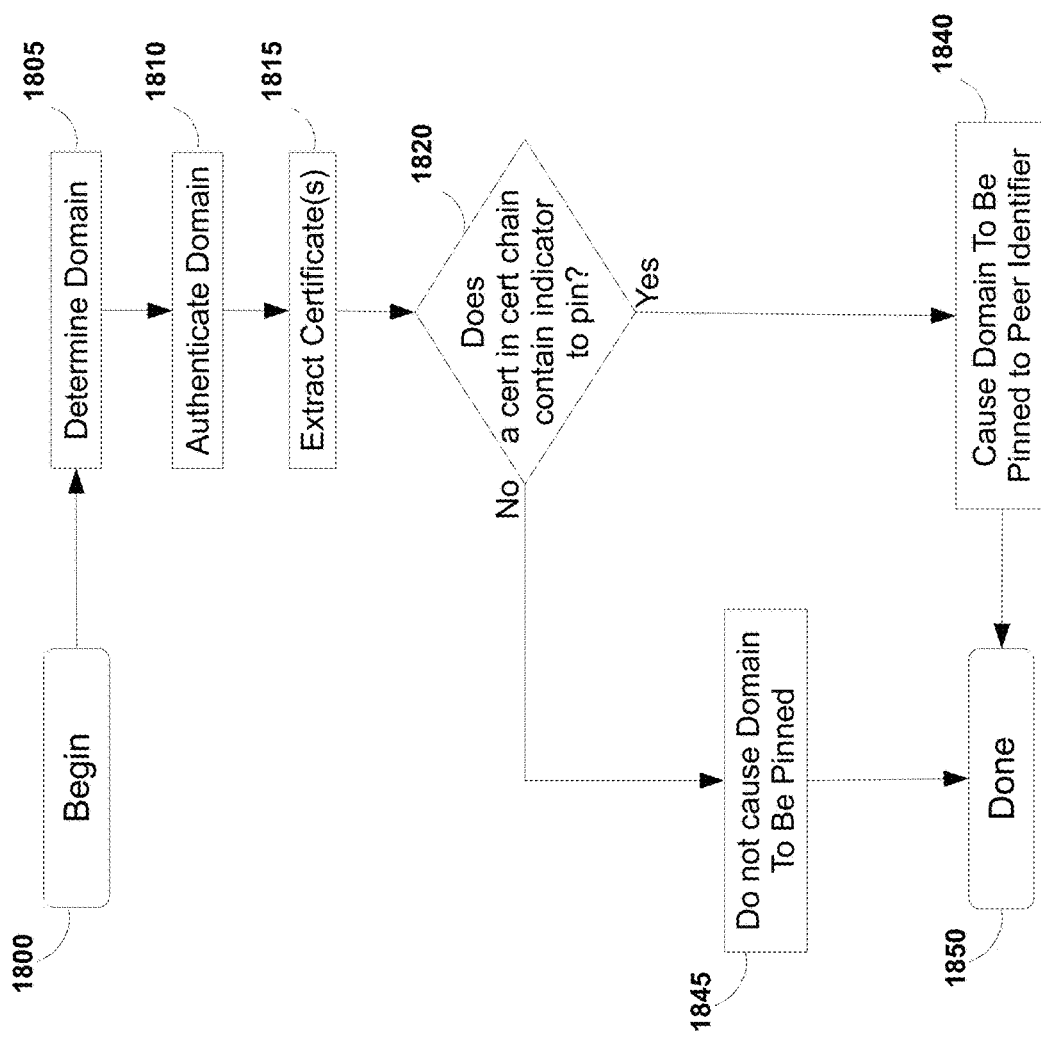
FIG. 18—illustrates a Pinning of a Domain to a Peer Identifier, according to an embodiment.

FIG. 18 illustrates a flowchart diagram for an embodiment of a security agent pinning a domain to a peer identifier. The pinning may be performed automatically for certificates issued by an authorized certificate pinning CA. The method begins at 1800. Operation 1805 determines a domain. The domain is either provided by a user, obtained from another entity, specified by another component (such as for example iterating over multiple domains), determined by examining a network message, or otherwise obtained. Next, the domain is authenticated using a secure communication protocol and digital certificates 1810. The digital certificates may be packaged into a certificate chain. The secure communication protocol may include for example SSL, TLS. Operation 1815 extracts one or more certificates used to authenticate the domain. Operation 1820 determines whether to pin the domain to the peer identifier by determining whether one of the certificates in the certificate chain contains a pinning indicator. Operation 1820 may involve iterating through multiple certificates in the certificate chain. If operation 1820 determines it should pin, then it causes the domain to be pinned to a peer identifier 1840. However, if at operation 1820 it determines not to pin, then the domain is not caused to be pinned 1845. Operation 1845 does not cause the domain to be pinned. Operation 1850 concludes the method.

Figure 18B:
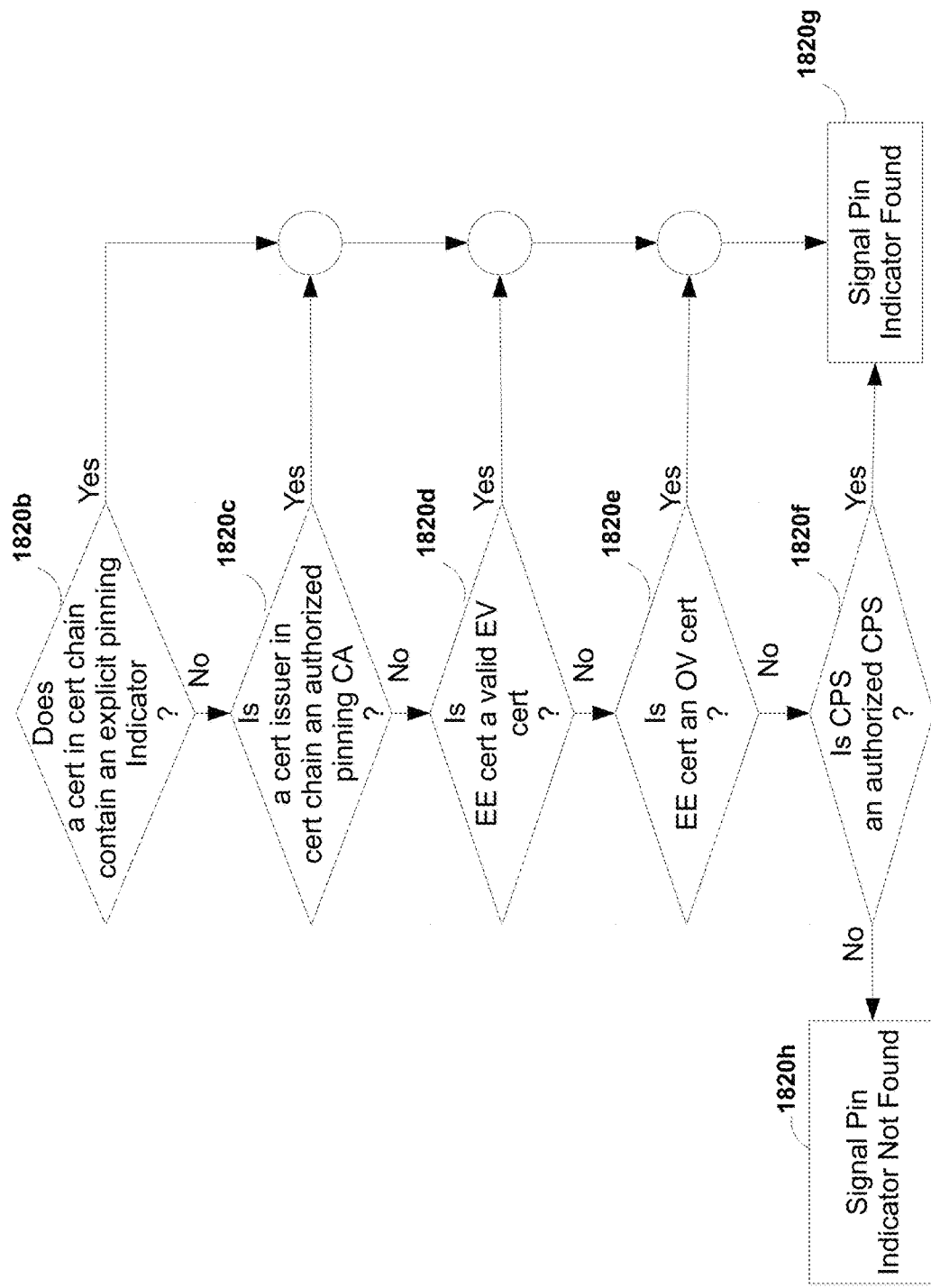
FIG. 18B—illustrates a Determining Whether a Certificate in a Certificate Chain Contains Indicator to Pin, according to an embodiment.

FIG. 18B illustrates operation 1820 from FIG. 18 in further detail. Operation 1820b determines whether a certificate in the certificate chain contains an explicit pinning indicator. Operation 1820c determines whether one of the certificate issuers in the certificate chain is an authorized pinning issuer. Furthermore, this determination may involve the retrieval of one or more authorized pinning issuers from storage, and comparing each certificate in the certificate chain. Operation 1820d determines whether the end entity certificate is an Extended Validation (EV) certificate. Operation 1820d may also involve checking whether the OID is one of the valid EV OID's. Operation 1820e determines whether the end entity certificate is an Organization Validated (OV) certificate. Operation 1820f determines whether the Certificate Practice Statement (CPS) is an authorized Certificate Practice Statement (CPS). If any of the operations of 1820b, 1820c, 1820d, 1820e, or 1820f conclude in an affirmative, then operation 1820g is next performed which signals that a pinning indicator was found. However, if all of the operations of 1820b, 1820c, 1820d, 1820e, and 1820f conclude in a negative, then operation 1820h is next performed which signals that pinning indicator was not found. Any of the operations 1820b, 1820c, 1820d, 1820e, or 1820f may involve iterating through multiple certificates in the certificate chain.

Certificate Types:

In some embodiments, a security agent examines one or more certificates to determine their type so it can determine whether to perform a pinning operation. For example, to determine certificate types, a security agent examines network communication details such as:

- a certificate contains a domain name in the "O=" component of the Subject DN field
- a certificate contains a domain name in the SubjectAltName field and it matches the domain being communicated with
- the WHOIS record matches the legal entity specified in the certificate
- the WHOIS record matches company information in the Subject certificate field In some embodiments, a security agent determines the type of certificate to determine whether to pin a domain to the certificate.

Figure 18C:
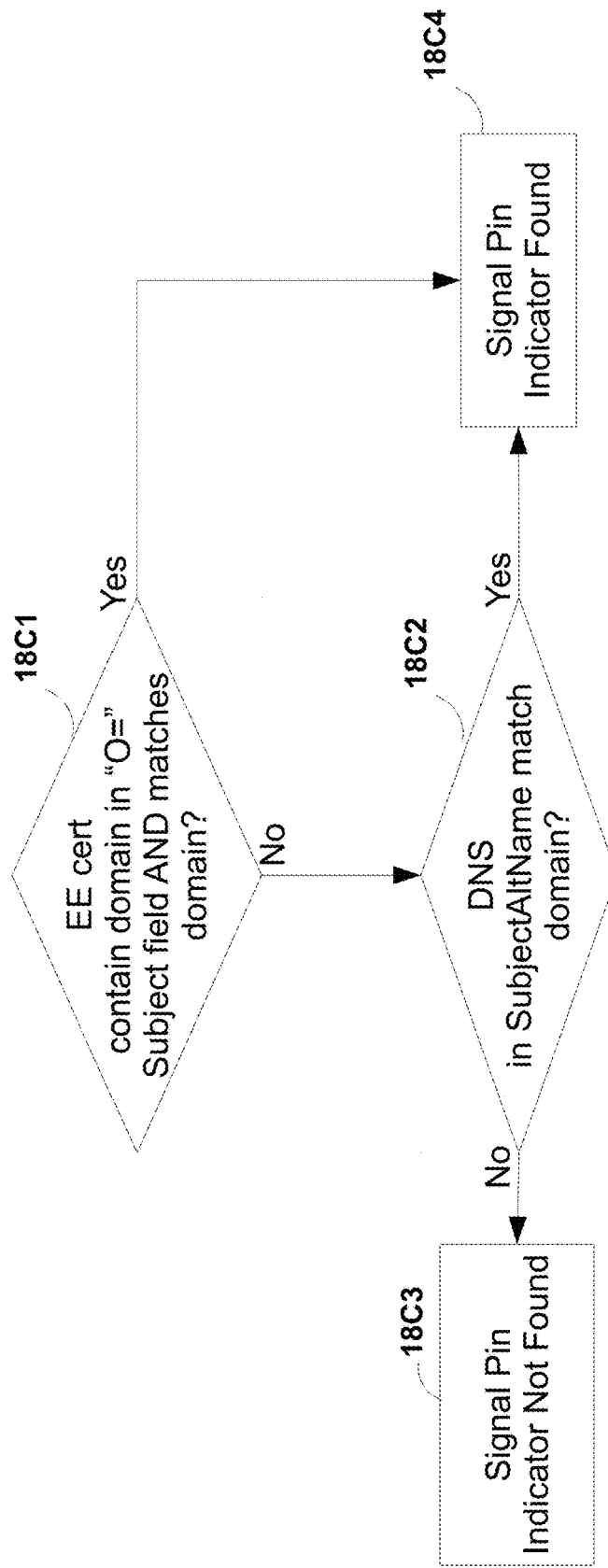
FIG. 18C—illustrates a Determining Whether a Certificate is an Organization Validated (OV) Certificate, according to an embodiment.

FIG. 18C illustrates operation 1820e of FIG. 18 in further detail. Operation 18C1 determines whether an end entity certificate contains domain name in the "O=" component of the Subject DN. Operation 18C2 determines whether the DNS in the SubjectAltName of the end entity certificate matches the domain. If the results of the determinations 18C1 or 18C2 result in the affirmative, then pin indicator signal is sent 18C4. If the results of the determinations 18C1 and 18C2 both result in negative, then pin indicator is not found signal is sent 18C3.

Figure 18D:
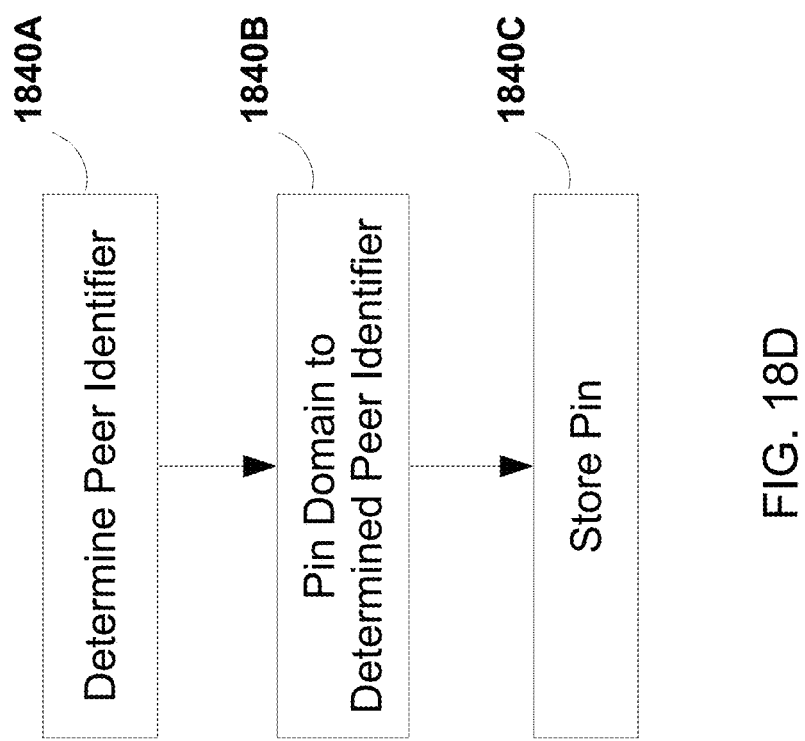
FIG. 18D—illustrates a Causing a Domain to be Pinned to a Peer Identifier, according to an embodiment.

FIG. 18D illustrates operation 1840 of FIG. 18 in further detail. Operation 1840A uses a digital certificate of the authenticated domain to determine a peer identifier. Details of a digital certificate that may be used include one or more of: the certificate itself, a public key, a subjectPublicKeyInfo (SPKI), a Subject DN, a SubjectAltName, an Issuer DN, a SubjectKeyIdentifier (SKI), an AuthorityKeyIdentifier (AKI), a SerialNumber, a SubjectUniqueId, an IssuerUniqueId, a digital Signature, a validity period, an AuthorityInformationAccess (AIA), a CertificateRevocationList (CRL), a CertificateDistributionPoint (CDP), an Online Certificate Status Protocol (OCSP) UniformResourceLocation (URI), or other detail. The peer identifiers may be unique. Next, the domain is pinned to the determined peer identifier 1840B. Next, the pin is stored 1840C. The pin may involve data related to one or more of: the authenticated domain, the determined peer identifier, digital certificate, any field of the digital certificate, a relationship indication between the authenticated domain and the certificate, a relationship indication between the authenticated domain and the peer identifier, a relationship indication between the authenticated domain and a field of the digital certificate, a relationship indication between two data items related to the communication. Storage may include but not limited to: a database, disk, cache, memory, repository, in-memory data structure, shared memory, or other data storage.

Figure 19:
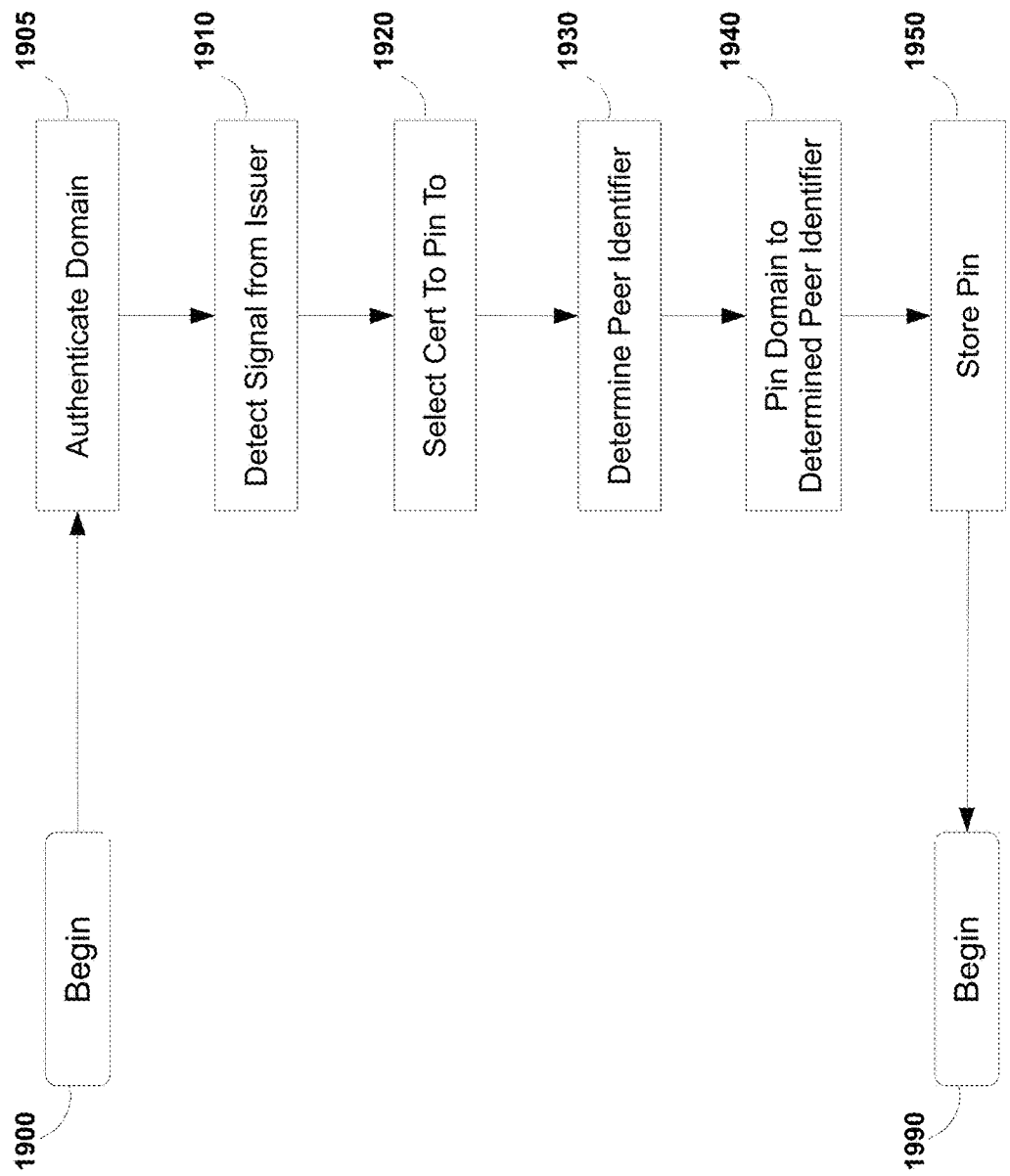
FIG. 19—illustrates a Detecting a Signal From Issuer to Pin a Domain to Peer Identifier, according to an embodiment.

FIG. 19 illustrates a flowchart of an embodiment of a security agent that detects a signal from a certificate issuer to pin a domain to a peer identifier. The process begins 1900 and the domain is authenticated using one or more certificates 1905, followed by detecting a signal from the issuer of one of the one or more certificates used to authenticate the domain 1910, followed by selecting a certificate to pin to (from the one or more certificates used to authenticate the domain) 1920, followed by determining a peer identifier from the selected certificate 1930, followed by pinning the domain to the determined peer identifier (where the pinning may involve specifying a relationship between the domain and the determined peer identifier) 1940, followed by storing the pin to a storage device 1950. The signal in 1910 may be consist of any detail related to communicating with the domain such as for example: certificate issuer information, a certificate containing one of a set of pre-selected ObjectIdentifier's (OID's), one of a set of pre-selected issuers, or any other pinning indicator. The storage device may include any kind of medium (such as for example: a database, disk, cache, memory, repository, in-memory data structure, shared memory, or other data storage medium).

Figure 20:
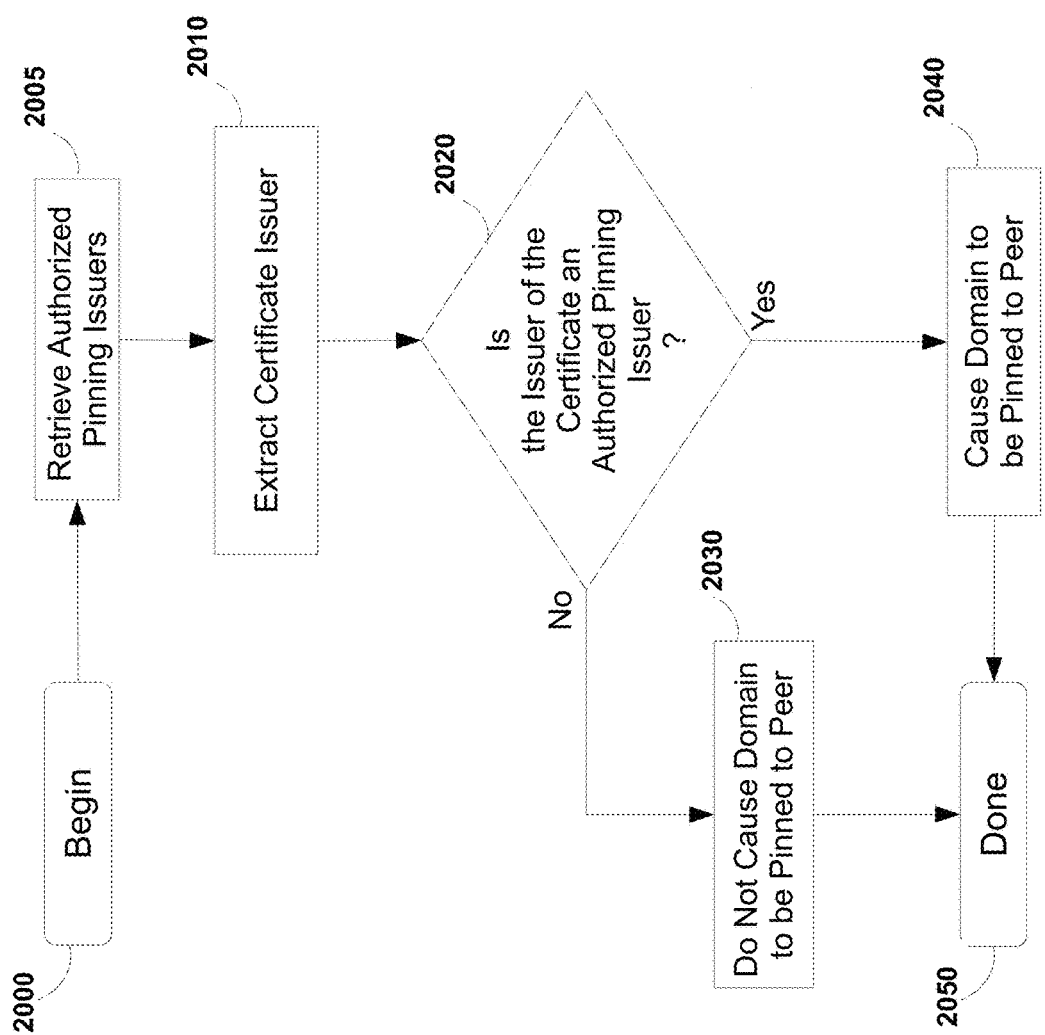
FIG. 20—illustrates a Pinning Based on Whether Issuer Is Authorized Pinning Issuer, according to an embodiment.

FIG. 20 illustrates a flowchart of an embodiment of a security agent that determines whether to pin a domain to a peer based on whether the issuer of a certificate is an authorized pinning issuer. The certificate may have been obtained during authentication of the domain using a secure communication protocol (such as SSL/TLS). One or more authorized pinning issuers are retrieved from storage in operation 2005. The certificate issuer is extracted from the certificate 2010. A determination is made whether the certificate issuer is present amongst the authorized pinning issuers 2020. If the result of the determination 2020 is that the certificate issuer is present amongst the authorized pinning issuers, then 2040 causes the domain to be pinned to the peer. If the result of the determination 2020 is that the certificate issuer is not present in the authorized pinning issuers, then 2030 does not cause the domain to be pinned to the peer. The domain may be uniquely identified. The Peer may be uniquely identified such as using a peer identifier.

FIG. 21 illustrates an example of a digital certificate containing an explicit pinning indicator. In this example, the pinning indicator value is a hostname. However, pinning indicator values may also take other forms such as for example: domain name, IP address, flag, boolean, certificate, public key, or other.

Figure 22:
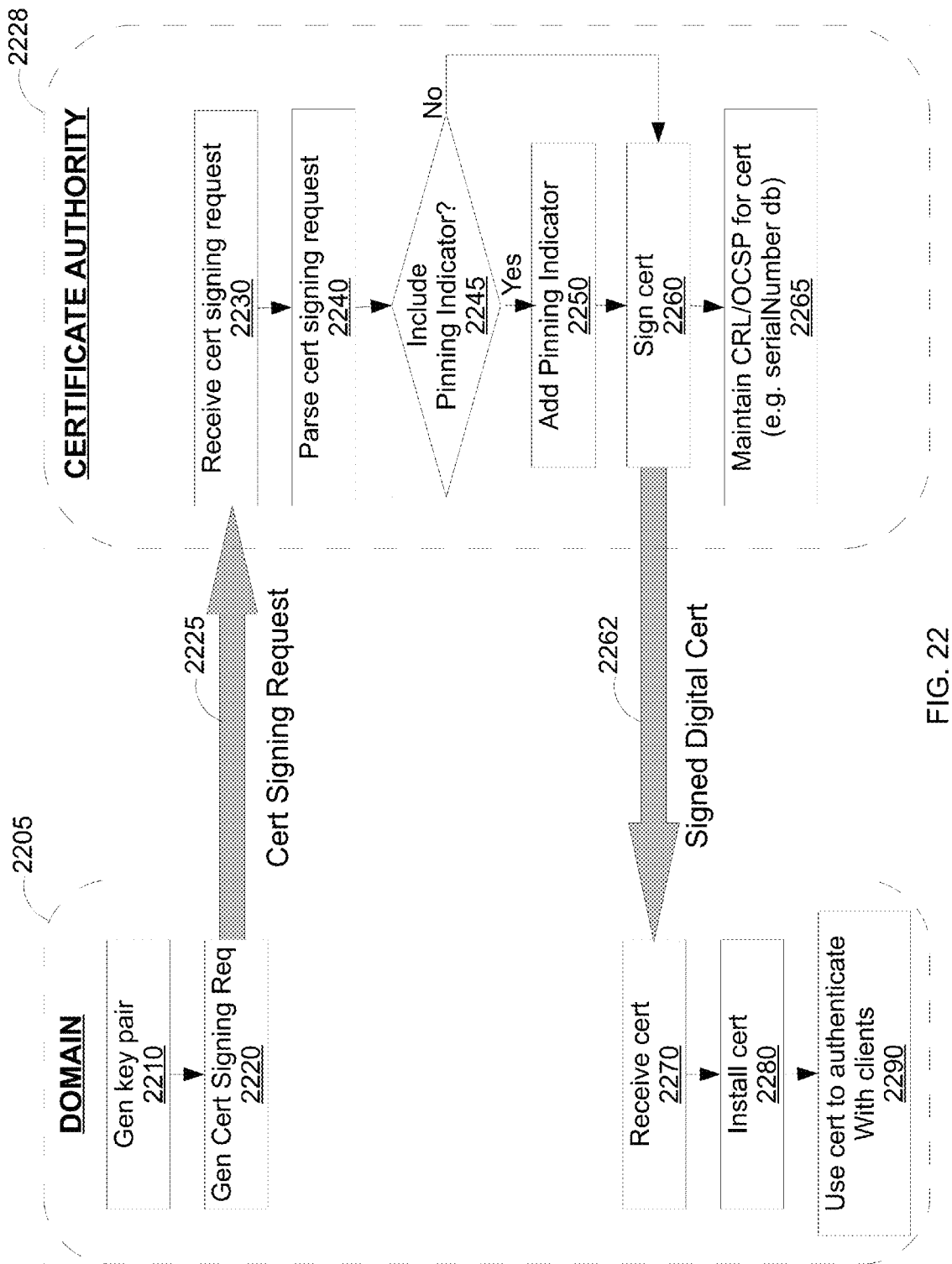
FIG. 22—illustrates a CA Issuing Certificates Containing Pinning Indicator, according to an embodiment.

FIG. 22 illustrates a flowchart diagram of the operations of a Domain 2205 and a Certificate Authority (CA) 2228 such that the Certificate Authority (CA) 2228 issues a certificate containing an explicit pinning indicator. The Domain 2205 and the Certificate Authority (CA) 2228 interact. Some of the Domain's operations 2205 are carried out by a domain administrator. Some of the Certificate Authority's operations 2228 are carried out by a CA administrator. The Domain 2205 generates a public key pair 2210.

The Domain 2205 generates a certificate signing request (CSR) based on the generated key pair in operation 2220. The certificate signing request may be a PKCS#10 request. The Domain 2205 may or may not specifically request a Certificate Authority (CA) 2228 include an explicit pinning indicator. The Domain 2205 makes the certificate signing request available to a Certificate Authority (CA) 2228 in operation 2225 (this may include transmission of the CSR).

The Certificate Authority (CA) 2228 receives the certificate signing request 2230, parses it (including extracting the public key) 2240. Next the Certificate Authority (CA) 2228 determines whether to include a pinning indicator in the certificate 2245. If the determination in 2245 results in Yes, then an explicit pinning indicator is added to the certificate 2250. In some embodiments, adding an explicit pinning indicator includes adding ASN.1 data (such as for example a certificate extension, criticality, and value) to the certificate. In some embodiments, adding an explicit pinning indicator includes specifying a CPS which indicates a pinning indicator. In some embodiments, adding an explicit pinning indicator involves creation of a new CPS which contains a pinning indicator. The determination 2245 may involve looking up a pinning indicator (e.g. the OID or extension) to add. If at 2245 the determination results in not including a pinning indicator, then the certificate is signed. The Certificate Authority (CA) 2228 signs the certificate containing the explicit pinning indicator 2260 and makes the certificate available to the Domain 2205 in operation 2262 (this may include transmission). The Domain 2205 receives the certificate 2270, and proceeds to install the certificate in an SSL server 2280, so that it can authenticate itself to clients 2290.

FIG. 22B illustrates operation 2245 of FIG. 22 in further detail. The process begins 2245a and determines whether inclusion of a pinning indicator was requested 2245b, if not then next it is determined whether the Certificate Practice Statement (CPS) requires inclusion of a pinning indicator 2245c, if not then it is determined whether the certificate type requires inclusion of a pinning indicator 2245d, if not then a signal is returned s to not include a pinning indicator in the certificate 2245e. If any of the determinations at operations 2245b, 2245c, or 2245d resulted in a positive, then a check is made whether inclusion of pinning indicator is authorized 2245f. The authorization check may include determining whether the client is authorized to request the pinning indicator, the CA is authorized to include the pinning indicator, whether the certificate is authorized to include the pinning indicator, or other related authorization. If the authorization 2245f fails, then a signal to not include the pinning indicator 2245e. However, if the authorization at 2245f succeeds, then a it signals to include a pinning indicator in the certificate is returned. After both 2245e and 2245g, the processes finishes 2245h. In various embodiments, operations 2245b, 2245c, 2245d can appear in any possible sequential order and/or some excluded. Similarly, 2245f can appear earlier.

Figure 23:
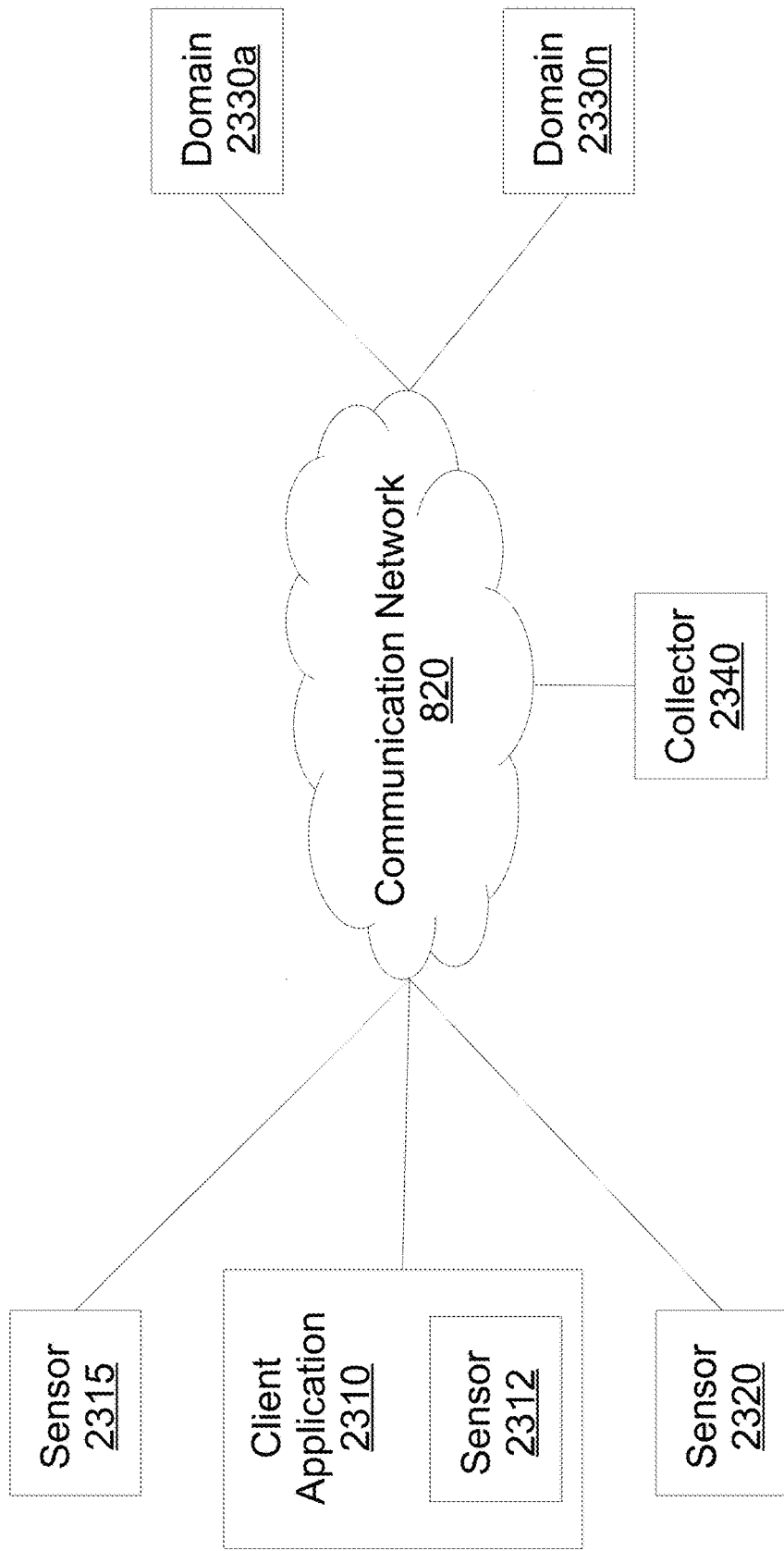
FIG. 23—illustrates a Deployed Sensors Feeding Pinning Information To a Collector, according to an embodiment.

FIG. 23 illustrates a network view of multiple deployed Sensors 2315, 2312, 2320 which feed pinning information over a Communication Network 820 to a Collector 2340. The deployed Sensors 2315, 2312, 2320 may obtain the pinning information from communicating with one or more Domains 2330a, 2330n. The Sensors may be stand-alone such as 2315 and 2320, or the Sensors 2312 may be embedded within a Client Application 2310. One or more sensors may act to collect data for the Collector 2340. The collected data may include digital certificates, pinning information, peer information, domain information, or other network data. The collected data may be used by other entities to influence or guide their network communications. The results of the sensors may be collected by a centralized entity that redistributes, or makes available the pinning information.

Figure 24:
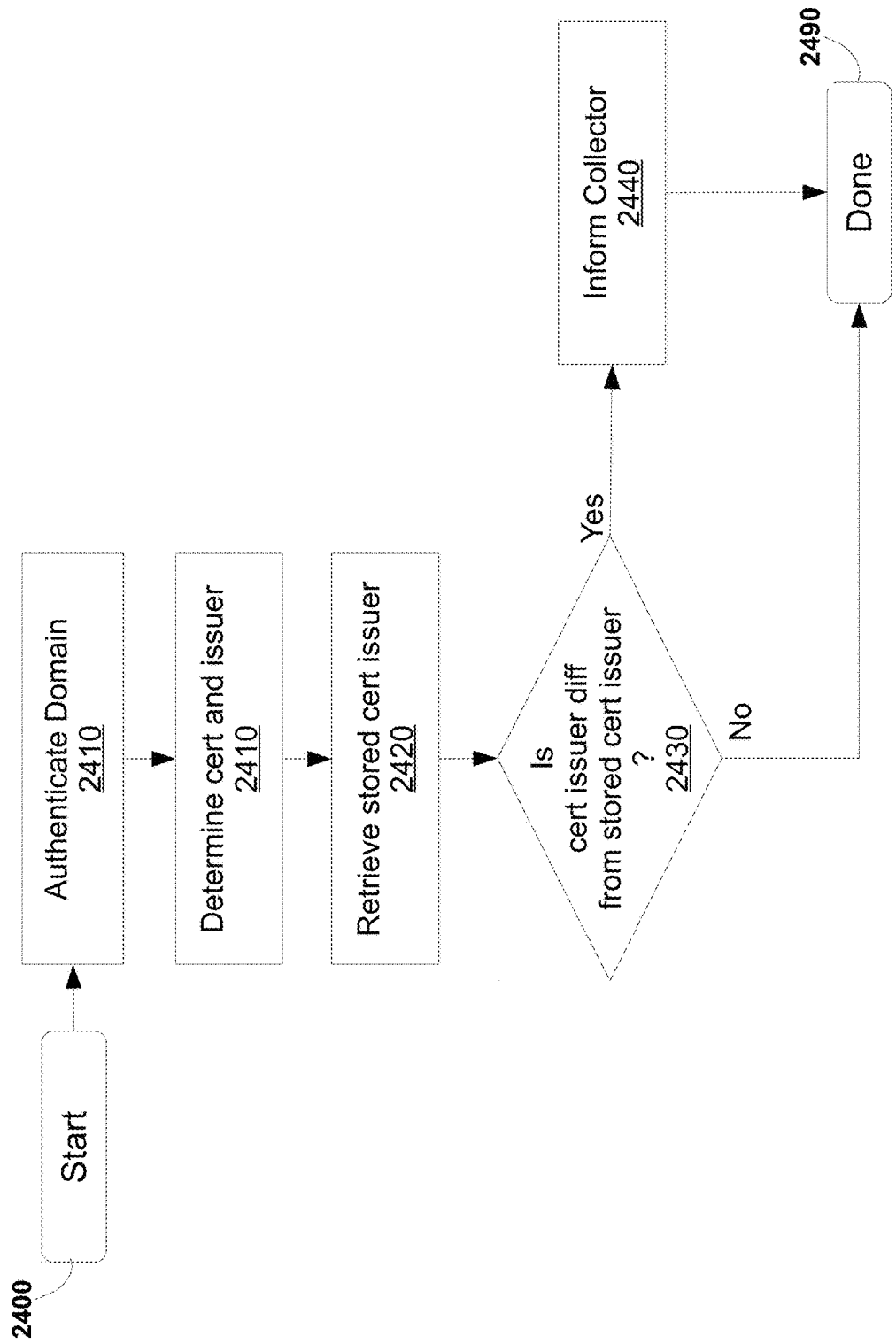
FIG. 24—illustrates a Sensor Detecting a Different Issuer Used in Authenticating a Domain, according to an embodiment.

FIG. 24 illustrates a flowchart diagram of an embodiment of a Sensor that informs a Collector when the Sensor detects a domain is authenticated using a different issuer. The process begins with 2400 and proceeds to authenticate a domain 2410. The domain authentication 2410 may involve creating a secure communications channel (such as Secure Socket Layer (SSL) or Transport Layer Security (TLS) handshake). The stored issuer for the domain is retrieved 2420. The current Certificate Issuer is compared with the Stored Issuer for the domain 2430, and if different then the Collector is informed 2440, otherwise the process is done 2490. The Collector may assess the issuer information and act to influence network communications of other entities (such as for example client applications).

Figure 25:
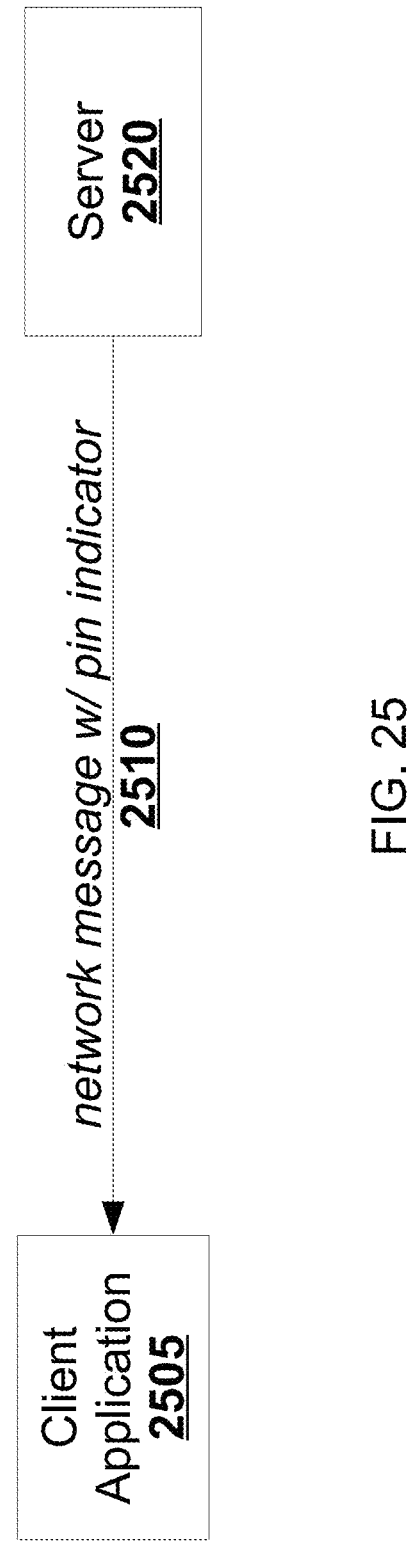
FIG. 25—illustrates a Pinning Indicator Within a Network Message, according to an embodiment.

FIG. 25 illustrates a network diagram showing a server 2520 providing a pinning indicating within a network message 2510 to a client application 2505. The network message may be part of a network protocol. An existing network protocol may be extended to provide the ability to provide a pinning indicator. A new network message may be created. The pinning indicator may include specifying one or more domains to pin a certificate to. For example, TLS protocol is extended with a new handshake message containing a pinning indicator. Another example, an existing TLS handshake message is extended with the ability to provide a pinning indicator.

Authorized Pinning Issuers:

In some embodiments, a security agent uses one or more authorized pinning issuers to determine whether to pin a domain to a certificate.

In some embodiments, one or more authorized pinning issuers are pre-defined, pre-loaded, embedded, hard-coded, local, or otherwise made accessible to a security agent.

In some embodiments, the one or more authorized pinning issuers may be remotely accessible to a security agent.

In some embodiments, one or more authorized pinning issuers are determined dynamically. In some embodiments, one or more authorized pinning issuers are provided by a third party.

In some embodiments, the domain is first authenticated and a secure communication channel is created before a pinning operation takes place.

In some embodiments, in addition to determining whether one or more peer identifiers are authorized pinning issuers, the certificate chain is validated.

In some embodiments, one or more authorized pinning issuers are maintained in a data structure such as a list, table, array, registry or other data structure.

In some embodiments, an existing set of CA certificates are marked or flagged for authorized pinning status. For example, a system maintains a set of trusted certificate authorities and are flagged with an additional flag for whether they are an authorized pinning issuer.

In some embodiments, pins are automatically created for domains when one or more authorized issuers are used to authenticate a domain.

Ruleset:

Ruleset may refer to one or more rules grouped or used together. Each rule in the ruleset may be evaluated individually. A ruleset may be embedded, or configurable (such as for example by an administrator). The ruleset consists of one single rule, or multiple rules.

In some embodiments, a security agent uses a decision tree to determine whether to perform an action. For example, a security agent uses a decision tree to determine whether to pin a domain to a certificate.

In some embodiments, a security agent uses pre-assessed data. For example, a human pre-assesses rule definitions, acceptable thresholds, or actions that a security agent uses in performing security operations.

Enterprise:

In some embodiments, a security agent is implemented to service multiple users of an enterprise. For example, a security agent is implemented in a network proxy and situated to intercept and/or manipulate network traffic for users or devices of an enterprise.

Domains Pinned To:

In some embodiments, a Subject-related certificate field is used in determining which domain to pin a certificate to. Subject-related certificate fields may include: a Subject DN, a SubjectAltName, or other Subject-related certificate field. In some certificates, there may be multiple fields, or within a field there may be multiple values—any of which may be used as the domain to pin a certificate to. For example, a security agent pins all of the domains found in the SubjectAltName extension of a X.509 certificate to the certificate.

In some embodiments, a peer identifier is pinned to more than one domain by using domains indicated within a digital certificate as domains to pin to.

Sensitive Data Release:

In some embodiments, a security agent monitors network communications to detect release of sensitive data, and once detected, the security agent determines a peer identifier, and pins the domain to the peer identifier. The security agent may detect the sensitive data through having direct knowledge of various sensitive data, or through pattern recognition (such as for example known credit card prefixes, etc. . . . ).

Enterprise Pinnings:

In some embodiments, an enterprise deploys a security agent to build up pinning information which is shared amongst one or more enterprise clients. For example, a security agent monitors all multiple devices within the enterprise, and when possible, determines pins for domains, and then enforces these pins for other enterprise devices.

Enterprise Configurable:

In some embodiments, the security agent is configurable, including items such as:
  Authorized pinning issuers
  Pinning indicators
  Authorized pinning OIDs
  Authorized CPS
  Authorized Subject DN C=country codes per Issuer
  Rulesets
  Rule parameters (functions, acceptable thresholds, actions)

For example, an enterprise is able to configure various parameters of a security agent thus allowing the security agent to comply with various corporate policies.

Variations:

In some cases, a domain is automatically pinned to a peer when a certificate obtained from an authenticated Secure Sockets Layer (SSL) or Transport Layer Security (TLS) session contains one or more specific attributes. Examples of the specific attributes may include: an Extended Validation (EV) ObjectIdentifier (OID), the certificate issuer is determined to be an authorized pinning issuer, the certificate type is determined to be an Organization Validated (OV) certificate type, the certificate is determined to be one of a specific set of Certification Practice Statement (CPS), or other.

In some cases, pinning a domain to a certificate involves examining whether the certificate contains specific attributes.

In some embodiments, a certificate chain is used to authenticate an entity, and automatically pin a domain to a certificate if the certificate contains a pinning indicator and/or if the certificate issuer is an authorized pinning issuer. One or more of the certificates may be obtained from a secure communication channel using digital certificates (such as an authenticated SSL/TLS session). The pinning indicator may include one or more of: the certificate contains an Extended Validation (EV) ObjectIdentifier (OID), the certificate is an Organization Validated (OV) certificate type, the certificate contains a pinning ObjectIdentifier (OID), the certificate references certain Certification Practice Statement (CPS), or other.

In some embodiments, determining when to pin a domain to a peer is done using a combination of explicit and implicit pinning indicators. For example, a security agent pins a domain to a peer if a certificate in a certificate chain contains an explicit pinning indicator, or examines details for implicit indicators such as one or more certificates in a certificate chain for whether one or more of the following: issuer is an authorized pinning issuer, the end entity certificate contains an Extended Validation (EV) ObjectIdentifier (OID), the certificate is deemed an OrganizationValidation (OV) certificate type, the Certificate Practice Statement (CPS) is a configured CPS.

Example Uses: Dynamically Determine Trustworthiness:

In some embodiments, a security agent is used by a web browser to guide or influence a user. Certificate issuer information is used as a factor in assessing a score, rating, or indication of trustworthiness of the server being communicated with.

Example Uses: Community:

In some embodiments, a security agent improves security for one or more other clients by dynamically sharing pinning information to help guide other client's network communications. For example, a security agent provides accumulated pinning information to a centralized service which aggregates pinning information from one or more security agent and redistributes the pinning information to clients so that the security of their network communications are improved.

Example Uses: Portable Devices:

An example use for a security agent is embedded with a portable device that are susceptible to attacks but suffer from a high level of abstraction of the operations being performed for them. Examples of portable devices may include: smartphone, clothing, personal attire, watch, or other.

In various embodiments of the invention, the operations discussed herein, e.g., with reference to the figures, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to the figures. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a memory;
a security agent, at least a portion of which is to be implemented in a hardware processor, to extract and examine a certificate, wherein the certificate is used in authentication of a first secure communication channel with a domain,
wherein the security agent stores in a non-transitory computer readable medium a relationship indicator between the domain and the certificate based on the detection of a pinning indicator within the extracted and examined certificate used in authentication of the first secure communication channel, wherein the detection of the pinning indicator comprises comparing the value of a field of the certificate with a predetermined value, and wherein data to be communicated over a second secure communication channel with the domain is secured via Secure Socket Layer (SSL) or Transport Layer Security (TLS) based on the stored relationship indicator between the domain and the certificate; and
wherein the relationship indicator comprises a pin in the certificate which records the domain, the certificate, and pin information into the memory for either the security agent or a web browser to enforce the pin.

2. The apparatus of claim 1, wherein the stored relationship indicator based on the detection of the pinning indicator is used by a web browser.

3. The apparatus of claim 2, wherein the stored relationship indicator based on the detection of the pinning indicator is used by a web browser for all subsequent communication channels.

4. The apparatus of claim 1, wherein the relationship indicator is to comprise one or more bits of data.

5. The apparatus of claim 1, wherein the relationship indicator is to comprise information corresponding to the certificate and the domain.

6. The apparatus of claim 1, wherein the field of the certificate is related to a certificate issuer.

7. The apparatus of claim 6, wherein the predetermined value identifies the certificate issuer by one or more of: an AuthorityKeyIdentifier, an AuthorityInformationAccess, an Object Identifier (OID), or a Certification Practice Statement (CPS).

8. The apparatus of claim 7, wherein the Object Identifier (OID) is an Extended Validation (EV) Object Identifier (OID).

9. The apparatus of claim 7, wherein the Object Identifier (OID) is an Organization Validated (OV) Object Identifier (OID).

10. The apparatus of claim 7, wherein the predetermined value is retrieved from storage.

11. The apparatus of claim 6, wherein the predetermined value identifies an authorized pinning issuer.

12. A method to improve secure communications comprising:
securing a first secure communication channel using one or more digital certificates;
extracting a certificate from the one or more digital certificates used to secure the first communication channel;
determining whether a pinning indicator is present within the extracted certificate by comparing a value of a field from the certificate with a predetermined value;
pinning a domain to the extracted certificate based on the determination of whether the pinning indicator is present, wherein pinning the domain involves storing a relationship between the domain and the extracted certificate used to secure the first secure communication channel; and
securing a second secure communication channel based on the stored relationship between the domain and the extracted certificate used to secure the first secure communication channel, wherein data communicated over the second secure communication channel is secured via Secure Socket Layer (SSL) or Transport Layer Security (TLS); and
wherein the relationship indicator comprises a pin in the certificate which records the domain, the certificate, and pin information into the memory for either the security agent or a web browser to enforce the pin.

13. The method of claim 12, wherein the relationship between the domain and the certificate is distributed to a client.

14. The method of claim 12, wherein the digital certificates are X.509v3 certificates.

15. The method of claim 14, wherein the value of a field from the extracted certificate is related to the issuer of the certificate and the predetermined value is an authorized pinning issuer, and wherein the authorized pinning issuer is retrieved from storage.

16. The method of claim 12, wherein the predetermined value is an Extended Validation (EV) Object Identifier (OID).

17. A non-transitory computer-readable medium comprising instructions, that when executed, perform:
examining certificate issuer information of a certificate, wherein the certificate is used in authentication of a first secure communication channel with a domain;
determining without an indication from the domain, whether to add a pin a-for the domain to the certificate based on the certificate issuer information of the certificate used to authenticate the domain; and
based on the determination whether to add a pin for the domain to the certificate, adding a pin for the domain to the certificate, wherein adding a pin for the domain to the certificate comprises adding a relationship between the domain and the certificate to an existing set of relationships between domains and certificates;
securing a second secure communication channel based on the stored relationship between the domain and the extracted certificate used to secure the first secure communication channel, wherein data communicated over the second secure communication channel is secured via Secure Socket Layer (SSL) or Transport Layer Security (TLS); and wherein the relationship indicator comprises a pin in the certificate which records the domain, the certificate, and pin information into the memory for either the security agent or a web browser to enforce the pin.

18. The non-transitory computer readable medium of claim 17, wherein the certificate issuer information includes one or more of: an AuthorityKeyIdentifier certificate field, an AuthorityInformationAccess certificate field, an Extended Validation ObjectIdentifier within a certificate field, or a Certificate Practice Statement referencing indication to pin.

19. The non-transitory computer readable medium of claim 17, wherein the certificate is an x.509v3 Certificate.

20. The non-transitory computer readable medium of claim 19, wherein the result of the determination is distributed to a client.

21. The non-transitory computer readable medium of claim 17, wherein adding a relationship between the domain and the certificate to an existing set of relationships between domains and certificates comprises storing to a storage device.

* * * * *